(12) United States Patent
Tang et al.

(10) Patent No.: US 10,191,252 B2
(45) Date of Patent: Jan. 29, 2019

(54) PHOTOGRAPHING OPTICAL LENS SYSTEM, IMAGE CAPTURING APPARATUS AND ELECTRONIC DEVICE

(71) Applicant: LARGAN PRECISION CO., LTD., Taichung (TW)

(72) Inventors: Hsiang-Chi Tang, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 141 days.

(21) Appl. No.: 15/461,664

(22) Filed: Mar. 17, 2017

(65) Prior Publication Data

US 2018/0106984 A1 Apr. 19, 2018

(30) Foreign Application Priority Data

Oct. 19, 2016 (TW) .............................. 105133740 A

(51) Int. Cl.
| | |
|---|---|
| G02B 7/02 | (2006.01) |
| G02B 13/00 | (2006.01) |
| G02B 9/62 | (2006.01) |
| G02B 5/00 | (2006.01) |
| G02B 5/20 | (2006.01) |

(52) U.S. Cl.
CPC .......... *G02B 13/006* (2013.01); *G02B 5/005* (2013.01); *G02B 5/208* (2013.01); *G02B 9/62* (2013.01); *G02B 13/0045* (2013.01)

(58) Field of Classification Search
CPC ...... G02B 13/0045; G02B 9/62; G02B 13/18; G02B 13/04; G02B 13/16; G02B 7/028; G02B 13/006; G02B 5/005; G02B 5/208; H04N 5/2254

USPC .......................................... 359/713, 756–762
See application file for complete search history.

(56) References Cited

U.S. PATENT DOCUMENTS 9,360,656 B2 6/2016 Yamazaki et al.
2014/0177068 A1* 6/2014 Tomioka ................ G02B 13/18
359/687

(Continued)

FOREIGN PATENT DOCUMENTS

WO 2014/006822 A1 1/2014

*Primary Examiner* — William R Alexander
*Assistant Examiner* — Henry A Duong
(74) *Attorney, Agent, or Firm* — McClure, Qualey & Rodack, LLP

(57) ABSTRACT

A photographing optical lens system includes at least six lens elements, wherein the photographing optical lens system includes at least one cemented lens group cemented by two of the lens elements adjacent to each other. The at least one cemented lens group includes, in order from an object side to an image side, a first cemented lens element, a cemented layer and a second cemented lens element. The first cemented lens element has a cemented image-side surface being aspheric. The cemented layer has a cemented object-side surface and a cemented image-side surface. The second cemented lens element has a cemented object-side surface being aspheric. An aspheric coefficient of the cemented image-side surface of the first cemented lens element is different from an aspheric coefficient of the cemented object-side surface of the second cemented lens element. One of the lens elements closest to an imaged object has positive refractive power.

20 Claims, 20 Drawing Sheets

(56) References Cited

U.S. PATENT DOCUMENTS

2015/0070778 A1* 3/2015 Amano ................ G02B 13/22
 359/663
2015/0309293 A1* 10/2015 Yamada ............. H04N 5/23209
 348/340

* cited by examiner

US 10,191,252 B2

PHOTOGRAPHING OPTICAL LENS SYSTEM, IMAGE CAPTURING APPARATUS AND ELECTRONIC DEVICE

RELATED APPLICATIONS

This application claims priority to Taiwan Application Serial Number 105133740, filed Oct. 19, 2016, which is herein incorporated by reference.

BACKGROUND

Technical Field

The present disclosure relates to a photographing optical lens system and an image capturing apparatus. More particularly, the present disclosure relates to a compact photographing optical lens system and an image capturing apparatus, each of which has a large aperture and is applicable to electronic devices.

Description of Related Art

In recent years, with the light and thin trend of electronic products, the optical systems employed in the electronic products with a large field of view are developing. However, it is difficult to obtain a large aperture and a short total track length simultaneously with the arrangement of lens elements used in a conventional optical system. Moreover, the recently developed optical systems normally adopt more lens elements. However, with the increased number of the lens elements, the amount of stray light has increased. Furthermore, it is difficult to satisfy the requirement of compact size and solve other manufacturing problems with the increased number of the lens elements.

SUMMARY

According to one aspect of the present disclosure, a photographing optical lens system includes at least six lens elements, wherein the photographing optical lens system includes at least one cemented lens group cemented by two of the lens elements adjacent to each other. The at least one cemented lens group includes, in order from an object side to an image side, a first cemented lens element, a cemented layer and a second cemented lens element. The first cemented lens element has a cemented image-side surface being aspheric. The cemented layer has a cemented object-side surface and a cemented image-side surface. The second cemented lens element has a cemented object-side surface being aspheric. An aspheric coefficient of the cemented image-side surface of the first cemented lens element is different from an aspheric coefficient of the cemented object-side surface of the second cemented lens element. When a central thickness of the cemented layer is CLT, the following condition is satisfied: 5 μm≤CLT≤100 μm. One of the lens elements closest to an imaged object has positive refractive power.

According to another aspect of the present disclosure, an image capturing apparatus includes the photographing optical lens system according to the aforementioned aspect and an image sensor, wherein the image sensor is disposed on an image surface of the photographing optical lens system.

According to still another aspect of the present disclosure, an electronic device includes the image capturing apparatus according to the aforementioned aspect.

BRIEF DESCRIPTION OF THE DRAWINGS

The present disclosure can be more fully understood by reading the following detailed description of the embodiments, with reference made to the accompanying drawings as follows.

DETAILED DESCRIPTION

Figure 1:
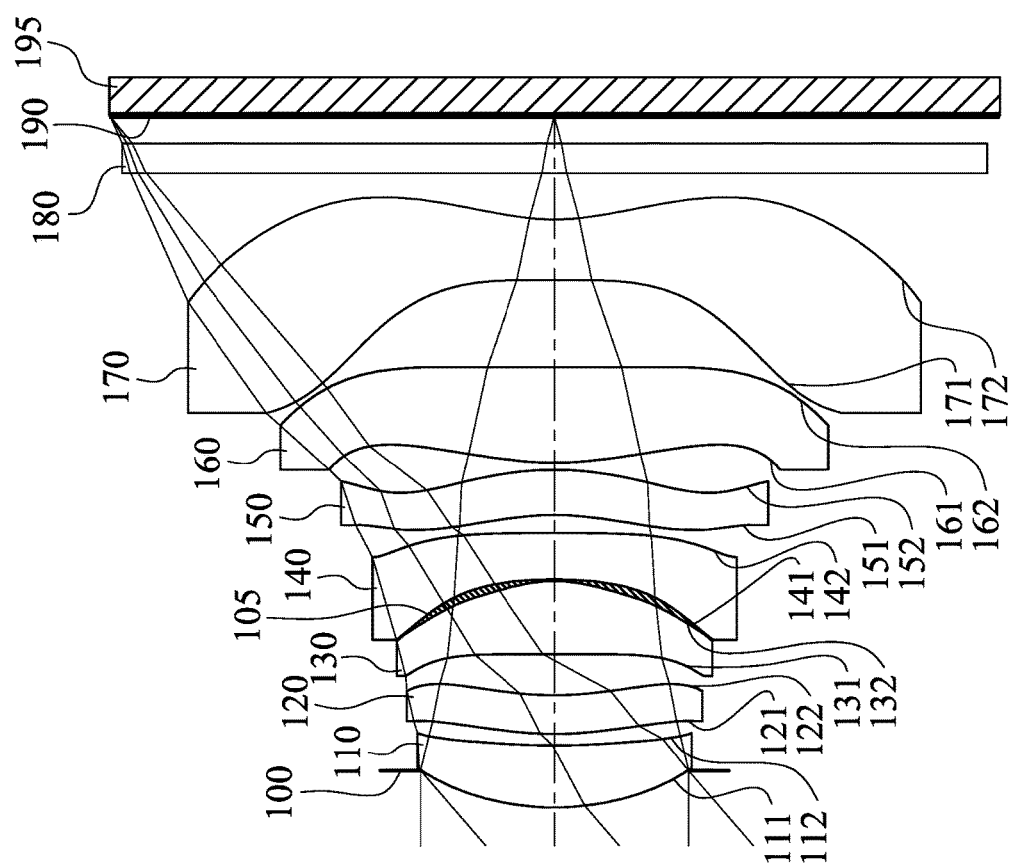
FIG. 1 is a schematic view of an image capturing apparatus according to the 1st embodiment of the present disclosure.

A photographing optical lens system includes at least six lens elements, wherein the photographing optical lens system includes at least one cemented lens group cemented by two of the lens elements adjacent to each other. The at least one cemented lens group includes, in order from an object side to an image side, a first cemented lens element, a cemented layer and a second cemented lens element. In the cemented lens group, the first cemented lens element has a cemented image-side surface, the second cemented lens element has a cemented object-side surface, wherein the cemented image-side surface of the first cemented lens element and the cemented object-side surface of the second cemented lens element are aspheric, and an aspheric coefficient of the cemented image-side surface of the first cemented lens element is different from an aspheric coefficient of the cemented object-side surface of the second cemented lens element. Therefore, the cemented lens group cemented via two aspheric surfaces can obtain several advantages in imaging. For example, the difference of the refractive index in the space between the first cemented lens element and the second cemented lens element can be reduced, which can effectively suppress the undesirable reflection generated from the refracting light, while avoiding ghost images. Moreover, with the cemented surfaces of the second cemented lens element and the first cemented lens element having different aspheric coefficients, the imaging benefits of the aspheric surfaces can be fully utilized for effectively providing the imaging functionality of every surface of the cemented lens group so as to improve image quality. Accordingly, the problem in losing the imaging functionality of each lens surface due to configurations of the identical or similar shapes of the cemented surfaces of a conventional cemented lens group can be resolved.

One of the lens elements closest to an imaged object has positive refractive power. Therefore, the total track length of the photographing optical lens system can be reduced, which is favorable for satisfying the requirement of compact size.

The cemented layer of the cemented lens group has a cemented object-side surface and a cemented image-side surface, wherein the cemented object-side surface of the cemented layer is tightly cemented with the cemented image-side surface of the first cemented lens element, and the cemented image-side surface of the cemented layer is tightly cemented with the cemented object-side surface of the second cemented lens element. The cemented layer can be a cemented glue, which can be regarded as a pseudo-lens element of the photographing optical lens system. Therefore, a shape and a thickness of the cemented layer can be designed with higher flexibility. When the photographing optical lens system has a compact size, the imaging functionality of the cemented lens group is better than that of a non-cemented lens element.

When a central thickness of the cemented layer is CLT, the following condition is satisfied: 5 μm≤CLT≤100 μm. Therefore, a cementing distance between the first cemented lens element and the second cemented element is proper by avoiding the cemented glue not being evenly distributed to the peripheral region between the first cemented lens element and the second cemented lens element due to an excessively small cementing distance, and avoiding the problems related to the curing of the cemented glue due to an excessively large cementing distance (such as an excessively long time for curing or excessive shrinking of the cemented glue). Preferably, the following condition can be satisfied: 10 μm≤CLT≤70 μm.

When a maximum thickness of the cemented layer parallel to an optical axis is CLTmax, and a thickness in an off-axis region of the cemented layer parallel to the optical axis is CLTedge, the following condition can be satisfied: 1.25<CLTmax/CLTedge<10. Therefore, the cementing distance between the first cemented lens element and the second cemented element is proper.

When the maximum thickness of the cemented layer parallel to the optical axis is CLTmax, and the central thickness of the cemented layer is CLT, the following condition can be satisfied: 1.5<CLTmax/CLT<10. Therefore, the cementing distance between the first cemented lens element and the second cemented element is proper.

When a maximum of maximum effective radii of object-side surfaces and image-side surfaces of the lens elements of the photographing optical lens system is SDmax, and an entrance pupil diameter of the photographing optical lens system is PPD, the following condition can be satisfied: SDmax/EPD<1.75. Therefore, it is favorable for the compactness of the photographing optical lens system.

When a curvature radius of the cemented object-side surface of the cemented layer is CLTR1, and a curvature radius of the cemented image-side surface of the cemented layer is CLTR2, the following condition can be satisfied: |(CLTR1+CLTR2)/(CLTR1−CLTR2)|<5.0. Therefore, aberrations can be corrected by the cemented layer, and the stray light generated by surface reflection can be suppressed.

When a maximum image height of the photographing optical lens system is ImgH, and a curvature radius of an image-side surface of one of the lens elements closest to an image surface is Rlast, the following condition can be satisfied: 1.0<ImgH/Rlast<4.0. Therefore, it is favorable for maintaining the proper back focal length of the photographing optical lens system.

At least one of the cemented object-side surface and the cemented image-side surface of cemented layer can include at least one critical point. In other words, at least one of the cemented image-side surface of the first cemented lens element and the cemented object-side surface of the second cemented lens element includes at least one critical point. Therefore, it is favorable for reducing the incident angle of the off-axis field onto the image sensor, and the resolution of the peripheral image can be enhanced.

When a chief ray angle at the maximum image height incident on the image surface of the photographing optical lens system is CRA1.0Y, the following condition can be satisfied: 20 degrees<CRA1.0Y<45 degrees. Therefore, an incident angle favorable for satisfying the requirement of compact size and enhancing the image quality can be obtained.

When the lens element closest to the imaged object is a first lens element, a maximum effective radius of an object-side surface of the first lens element is SD11, and the maximum of the maximum effective radii of the object-side surfaces and the image-side surfaces of the lens elements of the photographing optical lens system is SDmax, the following condition can be satisfied: 0.25<SD11/SDmax<0.90. Therefore, it is favorable for the compactness of the photographing optical lens system.

Each of the lens element closest to the imaged object and the lens element closest to the image surface is a single and non-cemented lens element. Therefore, the assembling difficulty of the photographing optical lens system can be reduced, and the image quality can be enhanced.

When a focal length of the photographing optical lens system is f, and a displacement in parallel with an optical axis from an axial vertex to a maximum effective radius position on a surface having a smaller maximum effective radius of the cemented image-side surface of the first cemented lens element and the cemented object-side surface of the second cemented lens element is CLT_Sagmax, the following condition can be satisfied: 5<f/|CLT_Sagmax|. Therefore, the uneven distribution of the cemented glue between the cemented surfaces due to excessively curved off-axis regions of the cemented surfaces can be prevented.

The cemented lens group can have negative refractive power. Furthermore, the first cemented lens element can have positive refractive power, and the second cemented lens element can have negative refractive power and a convex image-side surface. Therefore, it is favorable for correcting aberrations of the photographing optical lens system.

When the maximum thickness of the cemented layer parallel to the optical axis is CLTmax, the following condition can be satisfied: 20 μm≤CLTmax≤150 μm. Therefore, difficult problems like the curing time control and the degree of the cemented glue shrink due to the excessively large cementing distance can be, avoided.

When an axial distance between an object-side surface of the lens element closest to the imaged object and the image surface is TL, and the maximum image height of the photographing optical lens system is ImgH, the following condition can be satisfied: TL/ImgH<3.0. Therefore, the image range can be increased, and the total track length of the photographing optical lens system can be reduced for more compactness.

Each of the first cemented lens element and the second cemented lens element of the cemented lens group can be made of a plastic material. Therefore, the surface shapes of the lens elements can be better arranged, and the manufacturing cost can be reduced.

When a minimum of central thicknesses of the lens elements of the photographing optical lens system is CTmin, and the maximum thickness of the cemented layer parallel to the optical axis is CLTmax, the following condition can be satisfied: 2.0<CTmin/CLTmax<25. Therefore, it is favorable for the compactness of the photographing optical lens system.

At least one of the lens elements of the photographing optical lens system can have an Abbe number greater than 15.0 and smaller than 22.0. Therefore, chromatic aberration of the photographing optical lens system can be balanced, so that image quality can be enhanced.

According to the photographing optical lens system of the present disclosure, the lens elements thereof can be made of a plastic material or a glass material. When the lens elements are made of glass materials, the arrangement of the refractive power of the photographing optical lens system may be more flexible to design. When the lens elements are made of plastic materials, the manufacturing cost can be effectively reduced. Furthermore, surfaces of each lens element can be arranged to be aspheric, since the aspheric surface of the lens element is easy to form a shape other than spherical surface so as to have more controllable variables for eliminating aberrations thereof, and to further decrease the required number of the lens elements. Therefore, the total track length of the photographing optical lens system can also be reduced.

According to the photographing optical lens system of the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise specified, when the lens element has a convex surface, it indicates that the surface can be convex in the paraxial region thereof; when the lens element has a concave surface, it indicates that the surface can be concave in the paraxial region thereof. According to the photographing optical lens system of the present disclosure, the refractive power or the focal length of a lens element being positive or negative may refer to the refractive power or the focal length in a paraxial region of the lens element.

According to the photographing optical lens system of the present disclosure, the photographing optical lens system can include at least one stop, such as an aperture stop, a glare stop or a field stop. The glare stop or the field stop is for eliminating the stray light and thereby improving the image resolution thereof.

According to the photographing optical lens system of the present disclosure, the image surface, depending on the corresponding image sensor, can be a planar surface or a curved surface with any curvature, particularly a curved surface being concave toward the object side.

According to the photographing optical lens system of the present disclosure, a critical point is a non-axial point of the lens surface (or of the cemented surface of the cemented layer) where its tangent is perpendicular to the optical axis.

According to the photographing optical lens system of the present disclosure, an aperture stop can be configured as a front stop or a middle stop. A front stop disposed between an imaged object and the first lens element can provide a longer distance between an exit pupil of the photographing optical lens system and the image surface to enable a telecentric effect, and thereby can improve the image-sensing efficiency of an image sensor. A middle stop disposed between the first lens element and the image surface is favorable for enlarging the field of view of the photographing optical lens system and thereby provides a wider field of view for the same.

According to the photographing optical lens system of the present disclosure, the photographing optical lens system can be applied to 3D (three-dimensional) image capturing applications, in products such as digital cameras, mobile devices, digital tablets, smart TVs, network monitoring devices, motion sensing input devices, driving recorders, rear view camera systems, extreme sports cameras, industrial robots, wearable devices and other electronic imaging products.

According to the present disclosure, an image capturing apparatus is provided. The image capturing apparatus includes the aforementioned photographing optical lens system according to the present disclosure and an image sensor, wherein the image sensor is disposed on or near the image surface of the aforementioned photographing optical lens system. With the two adjacent lens element cemented via two aspheric surfaces, the imaging functionality can be enhanced. Preferably, the image capturing apparatus can further include a barrel member, a holder member or a combination thereof.

According to the present disclosure, an electronic device is provided, wherein the electronic device includes the aforementioned image capturing apparatus. Therefore, it is favorable for enhancing the image quality. Preferably, the electronic device can further include but not limited to a control unit, a display, a storage unit, a random access memory unit (RAM) or a combination thereof.

According to the above description of the present disclosure, the following 1st-10th specific embodiments are provided for further explanation.

1st Embodiment

Figure 2:
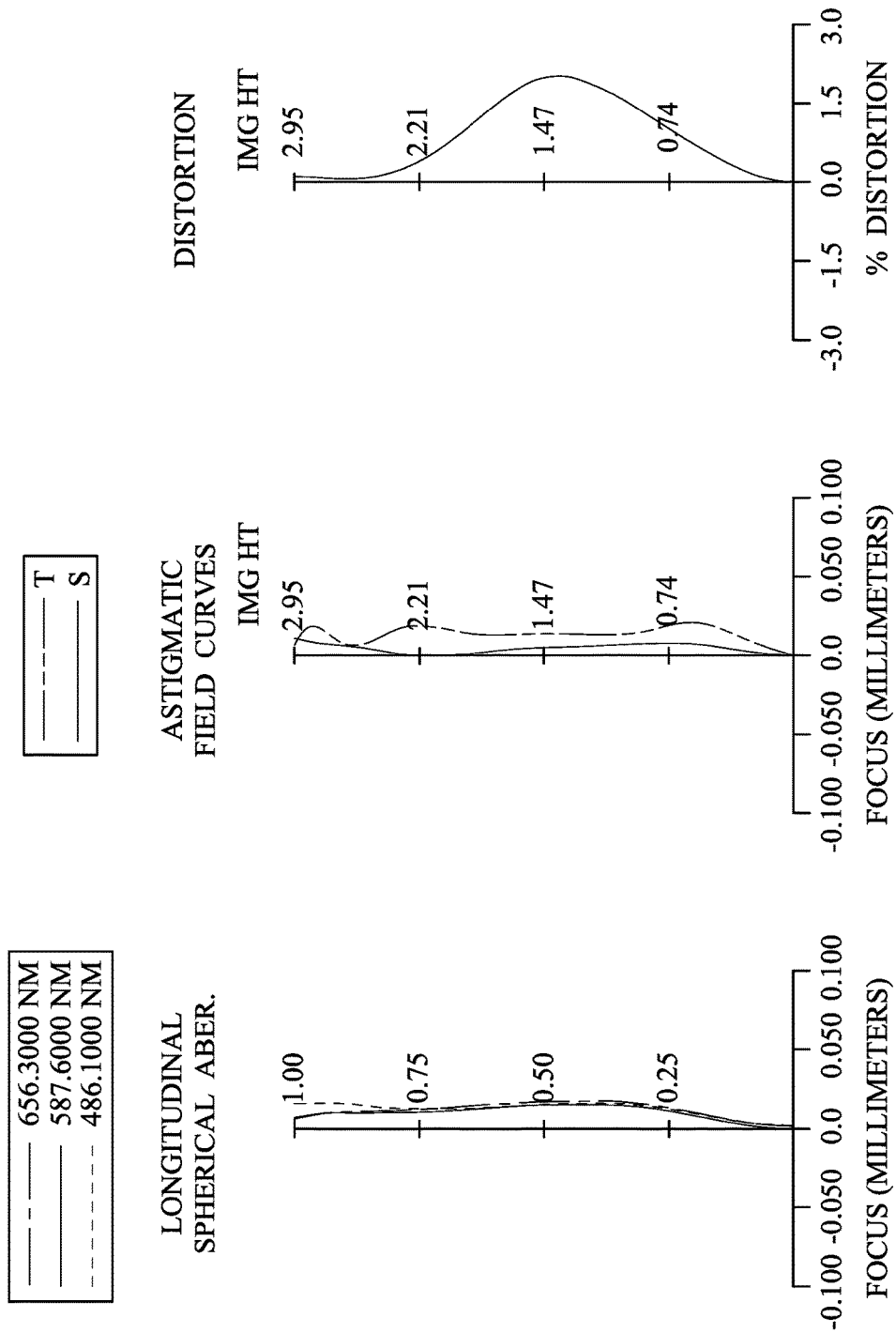
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows, in order from left to right, spherical aberration curves, astigmatic field curves and a distortion curve of the image capturing apparatus according to the 1st embodiment. In FIG. 1, the image capturing apparatus includes a photographing optical lens system (its reference numeral is omitted) and an image sensor 195. The photographing optical lens system includes, in order from an object side to an image side, an aperture stop 100, a first lens element 110, a second lens element 120, a third lens element 130, a cemented layer 105, a fourth lens element 140, a fifth lens element 150, a sixth lens element 160, a seventh lens element 170, an IR-cut filter 180 and an image surface 190. The image sensor 195 is disposed on the image surface 190 of the photographing optical lens system. The photographing optical lens system has a total of seven lens elements (110-170). Moreover, each of the lens element closest to an imaged object (i.e., the first lens element 110) and the lens element closest to the image surface 190 (i.e., the seventh lens element 17) is a single and non-cemented lens element.

The first lens element 110 with positive refractive power has a convex object-side surface 111 and a concave image-side surface 112. The first lens element 110 is made of a plastic material, and has the object-side surface 111 and the image-side surface 112 being both aspheric.

The second lens element 120 with positive refractive power has a convex object-side surface 121 and a concave image-side surface 122. The second lens element 120 is made of a plastic material, and has the object-side surface 121 and the image-side surface 122 being both aspheric.

The third lens element 130 with positive refractive power has a convex object-side surface 131 and a convex image-side surface 132. The third lens element 130 is made of a plastic material, and has the object-side surface 131 and the image-side surface 132 being both aspheric.

The fourth lens element 140 with negative refractive power has a concave object-side surface 141 and a convex image-side surface 142. The fourth lens element 140 is made of a plastic material, and has the object-side surface 141 and the image-side surface 142 being both aspheric.

The fifth lens element 150 with negative refractive power has a concave object-side surface 151 and a convex image-side surface 152. The fifth lens element 150 is made of a plastic material, and has the object-side surface 151 and the image-side surface 152 being both aspheric.

The sixth lens element 160 with positive refractive power has a convex object-side surface 161 and a convex image-side surface 162. The sixth lens element 160 is made of a plastic material, and has the object-side surface 161 and the image-side surface 162 being both aspheric.

The seventh lens element 170 with negative refractive power has a convex object-side surface 171 and a concave image-side surface 172. The seventh lens element 170 is made of a plastic material, and has the object-side surface 171 and the image-side surface 172 being both aspheric.

The IR-cut filter 180 is made of a glass material and located between the seventh lens element 170 and the image surface 190, and will not affect the focal length of the photographing optical lens system.

In the photographing optical lens system according to the 1st embodiment, the photographing optical lens system includes a cemented lens group (its reference numeral is omitted), wherein the cemented lens group is cemented by the third lens element 130 and the fourth lens element 140 adjacent to each other. Specifically, the cemented lens group includes, in order from the object side to the image side, a first cemented lens element (i.e., the third lens element 130), the cemented layer 105 and a second cemented lens element (i.e., the fourth lens element 140). The first cemented lens element has a cemented image-side surface (i.e., the image-side surface 132). The second cemented lens element has a cemented object-side surface (i.e., the object-side surface 141). The cemented layer 105 has a cemented object-side surface (its reference numeral is omitted) and a cemented image-side surface (its reference numeral is omitted). The cemented object-side surface of the cemented layer 105 is cemented with the cemented image-side surface of the first cemented lens element, and the cemented image-side surface of the cemented layer 105 is cemented with the cemented object-side surface of the second cemented lens element.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the photographing optical lens system according to the 1st embodiment, when the focal length of the photographing optical lens system is f, an f-number of the photographing optical lens system is Fno, and half of a maximum field of view of the photographing optical lens system is HFOV, these parameters have the following values: f=3.41 mm; Fno=1.92; and HFOV=40.8 degrees.

Figure 15:
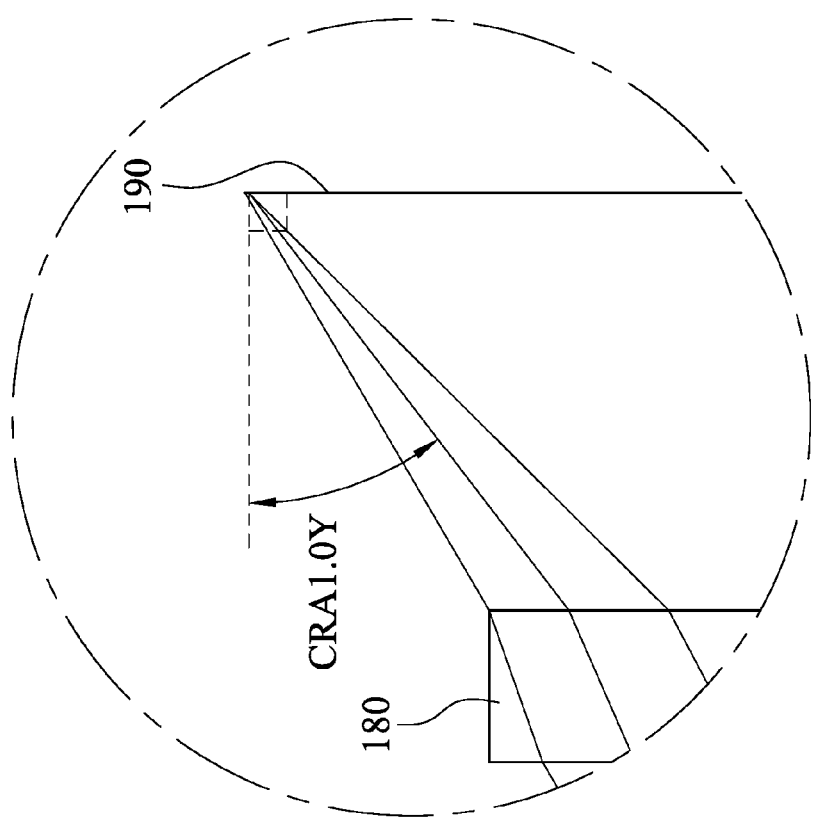
FIG. 15 shows a schematic view of the parameter CRA1.0Y of the photographing optical lens system of the image capturing apparatus according to FIG. 1.

FIG. 15 shows a schematic view of a parameter CRA1.0Y of the photographing optical lens system of the image capturing apparatus according to FIG. 1. In FIG. 15, when a chief ray angle at a maximum image height incident on the image surface 190 of the photographing optical lens system is CRA1.0Y, the following condition is satisfied: CRA1.0Y=31.4 degrees.

In the photographing optical lens system according to the 1st embodiment, when a central thickness of the cemented layer 105 is CLT, the following condition is satisfied; CLT=10.0 μm.

In the photographing optical lens system according to the 1st embodiment, when a maximum thickness of the cemented layer 105 parallel to the optical axis is CLTmax, the following condition is satisfied: CLTmax=55.8 μm.

In the photographing optical lens system according to the 1st embodiment, when the maximum thickness of the cemented layer 105 parallel to the optical axis is CLTmax, and a thickness in an off-axis region of the cemented layer 105 parallel to the optical axis is CLTedge (i.e., a distance between a maximum effective radius position on the image-side surface 132 and a maximum effective radius position on the object-side surface 141 parallel to the optical axis), the following condition is satisfied: CLTmax/CLTedge=4.63.

In the photographing optical lens system according to the 1st embodiment, when the maximum thickness of the cemented layer 105 parallel to the optical axis is CLTmax, and the central thickness of the cemented layer 105 is CLT, the following condition is satisfied: CLTmax/CLT=5.58.

In the photographing optical lens system according to the 1st embodiment, when a minimum of central thicknesses of lens elements of the photographing optical lens system (i.e., the central thickness of the second lens element 120) is CTmin, and the maximum thickness of the cemented layer 105 parallel to the optical axis is CLTmax, the following condition is satisfied: CTmin/CLTmax=5.52.

In the photographing optical lens system according to the 1st embodiment, when the maximum image height of the photographing optical lens system (i.e., half of a diagonal length of an effective photosensitive area of the image sensor 195) is ImgH, and a curvature radius of an image-side surface of the lens element closest to the image surface 190 (i.e., the image-side surface 172) is Rlast, the following condition is satisfied: ImgH/Rlast=1.94.

In the photographing optical lens system according to the 1st embodiment, when an axial distance between an object-side surface of the lens element closest to the imaged object (i.e., the object-side surface 111) and the image surface 190 is TL, and the maximum image height of the photographing optical lens system is ImgH, the following condition is satisfied: TL/ImgH=1.56.

Figure 16:
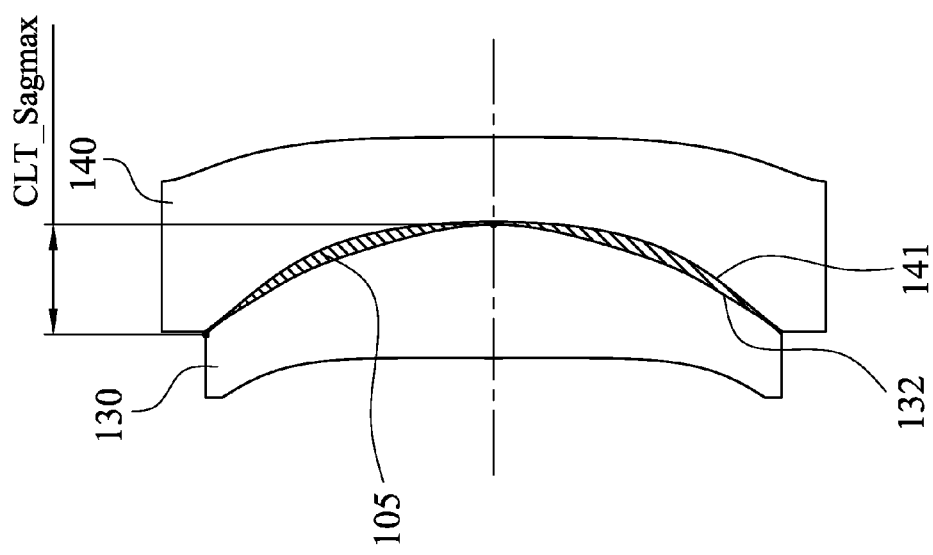
FIG. 16 shows a schematic view of the parameter CLT_Sagmax of the photographing optical lens system of the image capturing apparatus according to FIG. 1.

FIG. 16 shows a schematic view of the parameter CLT_Sagmax of the photographing optical lens system of the image capturing apparatus according to FIG. 1. As shown in FIG. 1 and FIG. 16, in the cemented lens group, when a displacement in parallel with the optical axis from an axial vertex to a maximum effective radius position on a surface having a smaller maximum effective radius of the cemented image-side surface of the first cemented lens element (i.e., the image-side surface 132) and the cemented object-side surface of the second cemented lens element (i.e., the object-side surface 141) is CLT_Sagmax (wherein the displacement towards the image side of the photographing optical lens system is positive, and the displacement towards the object side of the photographing optical lens system is negative; in the 1st embodiment, the cemented image-side surface of the first cemented lens element (i.e., the image-side surface 132) has the smaller maximum effective radius, i.e., CLT_Sagmax is the displacement in parallel with the optical axis from the axial vertex to the maximum effective radius position on the cemented image-side surface of the first cemented lens element), and the focal length of the photographing optical lens system is f, the following condition is satisfied: f/|CLT_Sagmax|=8.51.

Figure 17:
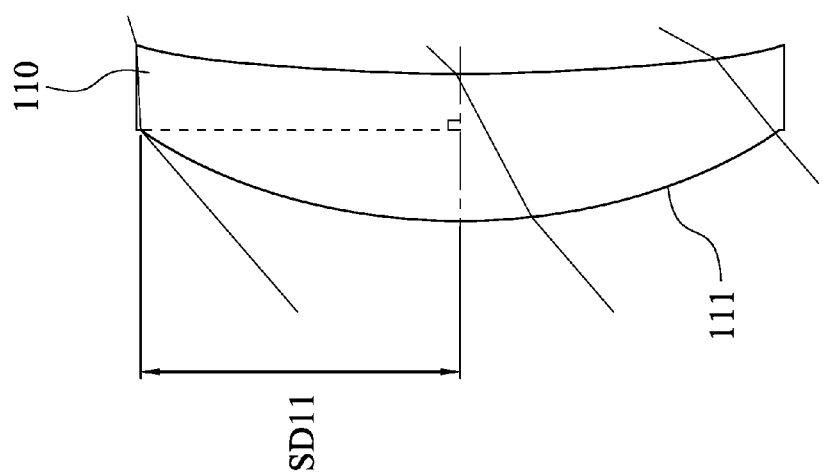
FIG. 17 shows a schematic view of the parameter SD11 of the photographing optical lens system of the image capturing apparatus according to FIG. 1.

FIG. 17 shows a schematic view of the parameter SD11 of the photographing optical lens system of the image capturing apparatus according to FIG. 1. As shown in FIG. 17, a maximum effective radius of the object-side surface 111 of the first lens element 110 is SD11, and a maximum of maximum effective radii of the object-side surfaces and the image-side surfaces of the lens elements of the photographing optical lens system (i.e., the maximum effective radius of the image-side surface 172) is SDmax, the following condition is satisfied: SD11/SDmax=0.37.

In the photographing optical lens system according to the 1st embodiment, when the maximum of the maximum effective radii of the object-side surfaces and the image-side surfaces of the lens elements of the photographing optical lens system (i.e., the maximum effective radius of the image-side surface 172) is SDmax, and an entrance pupil diameter of the photographing optical lens system is EPD, the following condition is satisfied: SDmax/EPD=1.37.

In the photographing optical lens system according to the 1st embodiment, when a curvature radius of the cemented object-side surface of the cemented layer 105 (i.e., a curvature radius of the image-side surface 132) is CLTR1, and a curvature radius of the cemented image-side surface of the cemented layer 105 is CLTR2 (i.e., a curvature radius of the object-side surface 141), the following condition is satisfied: |(CLTR1+CLTR2)/(CLTR1−CLTR2)|=1.91.

In the photographing optical lens system according to the 1st embodiment, each Abbe number of the fourth lens element 140 and the fifth lens element 150 is 20.4, each of which is greater than 15.0 and smaller than 22.0.

The detailed optical data of the 1st embodiment are shown in TABLE 1 and the aspheric surface data are shown in TABLE 2 below.

TABLE 1

1st Embodiment
f = 3.41 mm, Fno = 1.92, HFOV = 40.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.245 | | | | |
| 2 | Lens 1 | 1.812 | ASP | 0.414 | Plastic | 1.545 | 56.1 | 5.31 |
| 3 | | 4.456 | ASP | 0.076 | | | | |
| 4 | Lens 2 | 2.156 | ASP | 0.258 | Plastic | 1.544 | 56.0 | 52.52 |
| 5 | | 2.233 | ASP | 0.271 | | | | |
| 6 | Lens 3 | 40.045 | ASP | 0.487 | Plastic | 1.544 | 56.0 | 1.58 |
| 7 | | −0.872 | ASP | 0.010 | Cemented glue | 1.485 | 53.2 | |
| 8 | Lens 4 | −2.781 | ASP | 0.308 | Plastic | 1.660 | 20.4 | −4.42 |
| 9 | | −62.299 | ASP | 0.119 | | | | |
| 10 | Lens 5 | −1.880 | ASP | 0.300 | Plastic | 1.660 | 20.4 | −29.63 |
| 11 | | −2.212 | ASP | 0.050 | | | | |
| 12 | Lens 6 | 2.256 | ASP | 0.633 | Plastic | 1.544 | 56.0 | 3.95 |
| 13 | | −40.236 | ASP | 0.580 | | | | |
| 14 | Lens 7 | 254.977 | ASP | 0.400 | Plastic | 1.544 | 56.0 | −2.81 |
| 15 | | 1.518 | ASP | 0.310 | | | | |
| 16 | IR-cut filter | Plano | | 0.200 | Glass | 1.517 | 64.2 | — |
| 17 | | Plano | | 0.184 | | | | |
| 18 | Image | Plano | | — | | | | |

Reference wavelength is 587.6 nm (d-line).

TABLE 2

Aspheric Coefficients

| Surface # | 2 | 3 | 4 | 5 | 6 | 7 | 8 |
|---|---|---|---|---|---|---|---|
| k = | −5.7563E−02 | −3.0000E+01 | −2.8798E+00 | −4.2256E+00 | −1.0000E+00 | −1.9295E+00 | 5.5633E+00 |
| A4 = | 2.4567E−03 | −1.3326E−01 | −2.6690E−01 | −1.1808E−01 | −7.8258E−02 | 9.7786E−01 | −1.2250E−01 |
| A6 = | 3.5102E−02 | 3.5888E−01 | 4.0703E−01 | −3.1635E−02 | −5.2503E−02 | −3.2991E+00 | −1.3752E−01 |
| A8 = | −5.4537E−02 | −4.7213E−01 | −5.6426E−01 | 1.5653E−01 | −8.3933E−02 | 9.6664E+00 | 1.2267E−01 |
| A10 = | 8.8549E−02 | 3.6413E−01 | 7.1248E−01 | −3.9965E−01 | 5.9652E−02 | −2.1661E+01 | 8.6913E−03 |
| A12 = | −4.3426E−03 | 6.6807E−02 | −8.2062E−01 | 3.1241E−01 | −6.3434E−02 | 2.7621E+01 | −8.5416E−03 |
| A14 = | −8.9594E−02 | −3.5438E−01 | 5.8466E−01 | −1.5505E−01 | 2.0383E−02 | −1.7479E+01 | 3.1313E−02 |
| A16 = | 7.2303E−02 | 2.1690E−01 | −1.9510E−01 | 5.5327E−02 | 3.4262E−02 | 4.2767E+00 | 2.9445E−03 |

| Surface # | 9 | 10 | 11 | 12 | 13 | 14 | 15 |
|---|---|---|---|---|---|---|---|
| k = | −3.0000E+01 | −1.4701E+01 | −3.0654E−01 | −2.0856E+01 | 0.0000E+00 | 3.6968E+00 | −7.2959E+00 |
| A4 = | −1.0034E−01 | 2.3152E−02 | −6.5414E−03 | 8.2505E−03 | 7.0068E−02 | −3.0897E−01 | −1.3584E−01 |
| A6 = | 4.9295E−02 | 7.1143E−02 | 9.4122E−02 | −4.4789E−02 | −1.1490E−01 | 2.0946E−01 | 8.5897E−02 |
| A8 = | −1.4649E−01 | −9.0849E−03 | 1.4319E−02 | 2.0750E−02 | 7.8199E−02 | −1.6593E−01 | −4.3440E−02 |
| A10 = | 2.5432E−01 | −2.3184E−02 | −1.7969E−02 | −4.0550E−04 | −3.7643E−02 | 8.8796E−02 | 1.3259E−02 |
| A12 = | −2.4043E−01 | 1.8757E−03 | −3.2442E−03 | −9.1777E−03 | 1.1666E−02 | −2.4819E−02 | −2.3100E−03 |
| A14 = | 1.1047E−01 | 7.4484E−03 | 1.8759E−03 | 4.8224E−03 | −2.0620E−03 | 3.4170E−03 | 2.1282E−04 |
| A16 = | −1.6669E−02 | −2.6964E−03 |  | −8.4506E−04 | 1.5660E−04 | −1.8536E−04 | −8.1015E−06 |

In TABLE 1, the curvature radius, the thickness and the focal length are shown in millimeters (mm). Surface numbers 0-18 represent the surfaces sequentially arranged from the object-side to the image-side along the optical axis. In TABLE 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as TABLE 1 and TABLE 2 of the 1st embodiment. Therefore, an explanation in this regard will not be provided again.

2nd Embodiment

Figure 3:
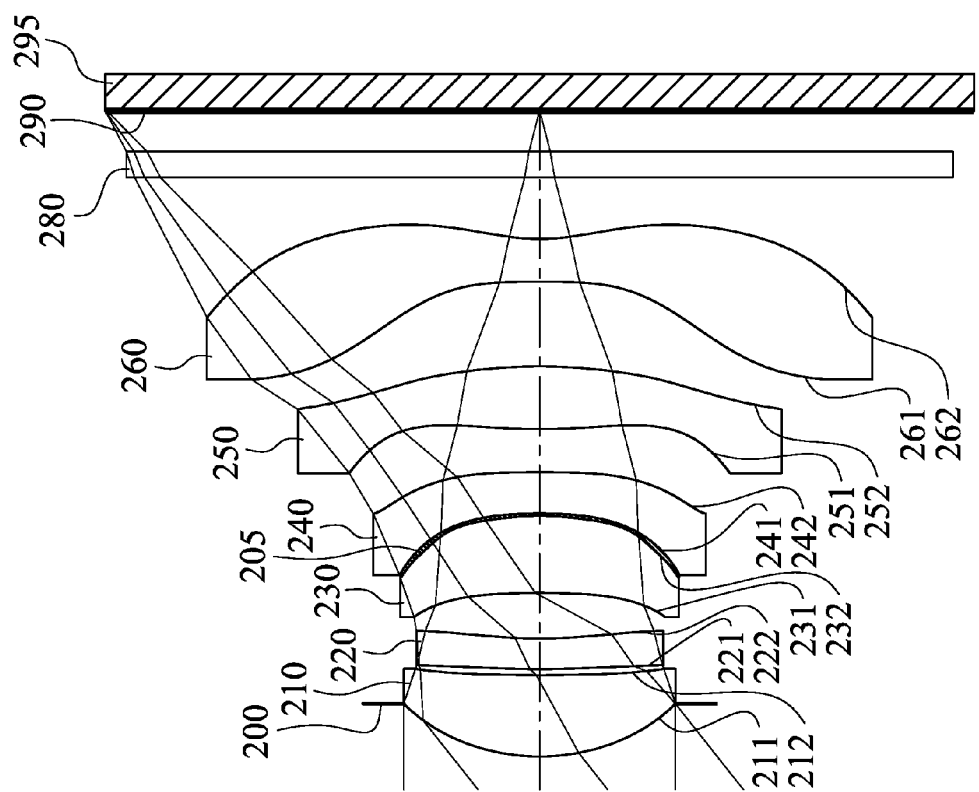
FIG. 3 is a schematic view of an image capturing apparatus according to the 2nd embodiment of the present disclosure.
Figure 4:
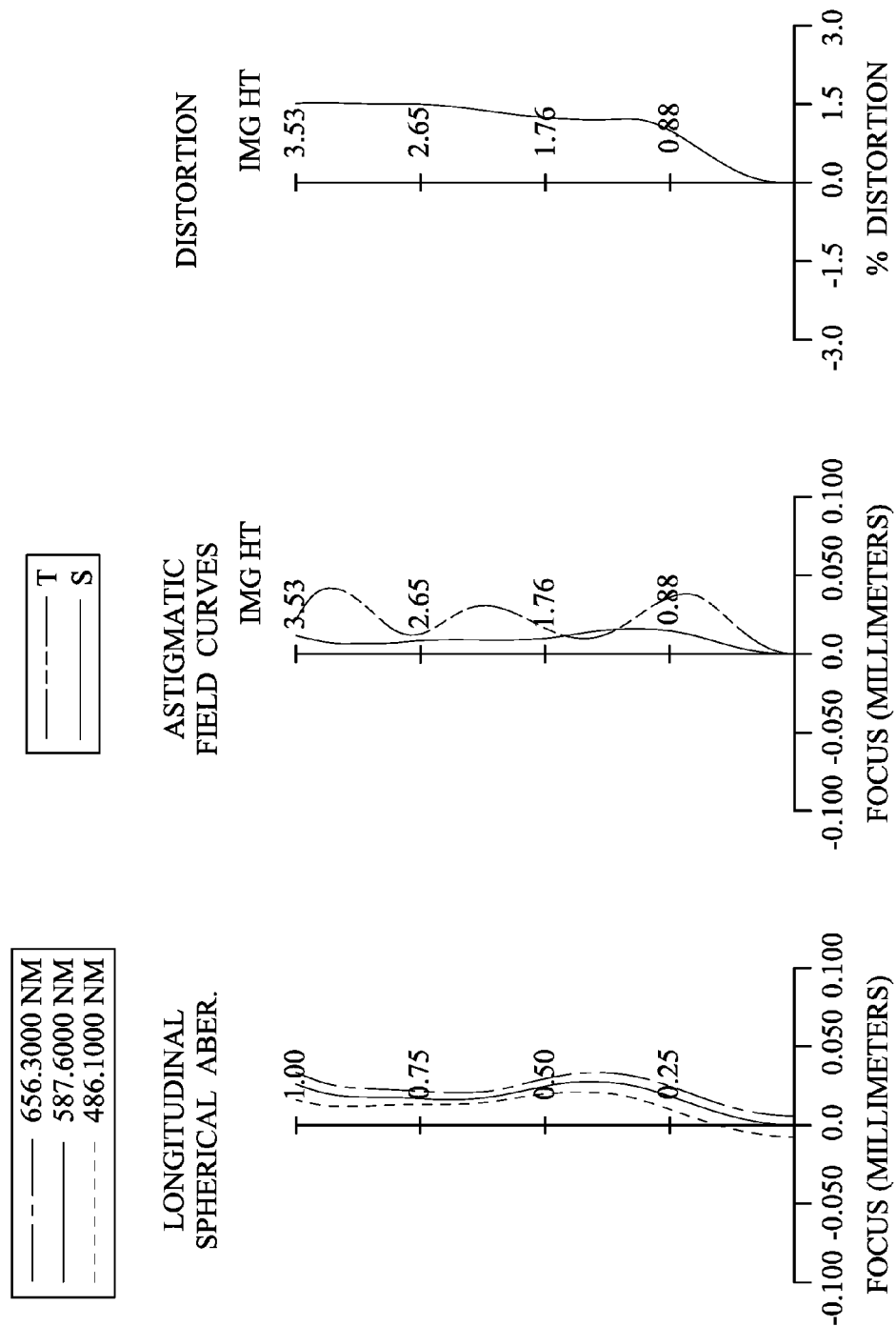
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows, in order from left to right, spherical aberration curves, astigmatic field curves and a distortion curve of the image capturing apparatus according to the 2nd embodiment. In FIG. 3, the image capturing apparatus includes a photographing optical lens system (its reference numeral is omitted) and an image sensor 295. The photographing optical lens system includes, in order from an object side to an image side, an aperture stop 200, a first lens element 210, a second lens element 220, a third lens element 230, a cemented layer 205, a fourth lens element 240, a fifth lens element 250, a sixth lens element 260, an IR-cut filter 280 and an image surface 290. The image sensor 295 is disposed on the image surface 290 of the photographing optical lens system. The photographing optical lens system has a total of six lens elements (210-260). Moreover, each of the lens element closest to an imaged object (i.e., the first lens element 210) and the lens element closest to the image surface 290 (i.e., the sixth lens element 260) is a single and non-cemented lens element.

The first lens element 210 with positive refractive power has a convex object-side surface 211 and a concave image-side surface 212. The first lens element 210 is made of a plastic material, and has the object-side surface 211 and the image-side surface 212 being both aspheric.

The second lens element 220 with negative refractive power has a convex object-side surface 221 and a concave image-side surface 222. The second lens element 220 is made of a plastic material, and has the object-side surface 221 and the image-side surface 222 being both aspheric.

The third lens element 230 with positive refractive power has a concave object-side surface 231 and a convex image-side surface 232. The third lens element 230 is made of a plastic material, and has the object-side surface 231 and the image-side surface 232 being both aspheric.

The fourth lens element 240 with negative refractive power has a concave object-side surface 241 and a convex image-side surface 242. The fourth lens element 240 is made of a plastic material, and has the object-side surface 241 and the image-side surface 242 being both aspheric.

The fifth lens element 250 with positive refractive power has a convex object-side surface 251 and a convex image-side surface 252. The fifth lens element 250 is made of a plastic material, and has the object-side surface 251 and the image-side surface 252 being both aspheric.

The sixth lens element 260 with negative refractive power has a concave object-side surface 261 and a concave image-side surface 262. The sixth lens element 260 is made of a plastic material, and has the object-side surface 261 and the image-side surface 262 being both aspheric.

The IR-cut filter 280 is made of a glass material and located between the sixth lens element 260 and the image surface 290, and will not affect the focal length of the photographing optical lens system.

In the photographing optical lens system according to the 2nd embodiment, the photographing optical lens system includes a cemented lens group (its reference numeral is omitted), wherein the cemented lens group is cemented by the third lens element 230 and the fourth lens element 240 adjacent to each other. Specifically, the cemented lens group includes, in order from the object side to the image side, a first cemented lens element (i.e., the third lens element 230), the cemented layer 205 and a second cemented lens element (i.e., the fourth lens element 240). The first cemented lens element has a cemented image-side surface (i.e., the image-side surface 232). The second cemented lens element has a cemented object-side surface (i.e., the object-side surface 241). The cemented layer 205 has a cemented object-side surface (its reference numeral is omitted) and a cemented image-side surface (its reference numeral is omitted). The cemented object-side surface of the cemented layer 205 is cemented with the cemented image-side surface of the first cemented lens element, and the cemented image-side surface of the cemented layer 205 is cemented with the cemented object-side surface of the second cemented lens element.

The detailed optical data of the 2nd embodiment are shown in TABLE 3 and the aspheric surface data are shown in TABLE 4 below.

TABLE 3

2nd Embodiment
f = 4.37 mm、Fno = 1.98、HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.430 | | | | |
| 2 | Lens 1 | 1.732 | ASP | 0.661 | Plastic | 1.515 | 56.5 | 3.90 |
| 3 | | 11.000 | ASP | 0.050 | | | | |
| 4 | Lens 2 | 6.905 | ASP | 0.250 | Plastic | 1.671 | 19.5 | −17.32 |
| 5 | | 4.268 | ASP | 0.370 | | | | |
| 6 | Lens 3 | −7.463 | ASP | 0.628 | Plastic | 1.559 | 40.4 | 3.14 |
| 7 | | −1.463 | ASP | 0.020 | Cemented glue | 1.485 | 53.2 | |
| 8 | Lens 4 | −2.878 | ASP | 0.334 | Plastic | 1.671 | 19.5 | −5.06 |
| 9 | | −19.807 | ASP | 0.350 | | | | |
| 10 | Lens 5 | 4.899 | ASP | 0.511 | Plastic | 1.559 | 40.4 | 4.02 |
| 11 | | −4.000 | ASP | 0.687 | | | | |
| 12 | Lens 6 | −30.549 | ASP | 0.350 | Plastic | 1.534 | 55.9 | −2.89 |
| 13 | | 1.629 | ASP | 0.500 | | | | |
| 14 | IR-cut filter | Plano | | 0.210 | Glass | 1.517 | 64.2 | — |
| 15 | | Plano | | 0.329 | | | | |
| 16 | Image | Plano | | — | | | | |

Reference wavelength is 587.6 nm (d-line).
The effective radius of the surface 6 is 1.020 mm.

TABLE 4

Aspheric Coefficients

| Surface # | 2 | 3 | 4 | 5 | 6 | 7 |
|---|---|---|---|---|---|---|
| k = | 8.8420E−01 | −7.8366E+01 | −5.8223E+01 | −1.0000E+00 | −4.3739E+01 | −6.6045E+00 |
| A4 = | −1.7815E−02 | −4.3446E−02 | −7.7841E−02 | −6.7040E−02 | −7.3942E−02 | 1.7642E+00 |
| A6 = | 5.9906E−03 | 1.1259E−01 | 1.2904E−01 | 4.0745E−02 | −1.0263E−01 | −1.1161E+01 |
| A8 = | −2.0041E−02 | −1.0825E−01 | −1.3960E−01 | −3.7325E−02 | 1.8776E−01 | 3.5218E+01 |
| A10 = | 1.3240E−02 | 5.5665E−02 | 7.4771E−02 | −3.1441E−02 | −3.3003E−01 | −6.3875E+01 |
| A12 = | −5.1157E−03 | −5.1986E−03 | −2.0469E−03 | 2.7910E−02 | 3.0074E−01 | 6.4361E+01 |
| A14 = | | | −9.0839E−03 | −1.4914E−02 | −1.0585E−01 | −3.3313E+01 |
| A16 = | | | | | | 6.8973E+00 |

| Surface # | 8 | 9 | 10 | 11 | 12 | 13 |
|---|---|---|---|---|---|---|
| k = | −6.6045E+00 | −7.2061E+01 | −6.6578E+01 | −3.1848E+01 | −4.2288E+01 | −9.4856E+00 |
| A4 = | 1.7642E+00 | 5.0132E−02 | 1.5051E−02 | 9.5721E−03 | −2.9621E−01 | −1.3693E−01 |
| A6 = | −1.1161E+01 | −2.6282E+00 | −1.5083E−01 | −6.6766E−02 | 1.4771E−01 | 6.7140E−02 |
| A8 = | 3.5218E+01 | 9.8346E+00 | 1.3580E−01 | 4.7329E−02 | −3.5208E−02 | −2.0641E−02 |
| A10 = | −6.3875E+01 | −1.8585E+01 | −7.4740E−02 | −1.4433E−02 | 4.8615E−03 | 3.9828E−03 |
| A12 = | 6.4361E+01 | 1.8767E+01 | 2.1732E−02 | 2.2514E−03 | −3.9865E−04 | −4.7770E−04 |
| A14 = | −3.3313E+01 | −9.6400E+00 | −2.9783E−03 | −1.7711E−04 | 1.8096E−05 | 3.2125E−05 |
| A16 = | 6.8973E+00 | 1.9744E+00 | 1.5176E−04 | 5.4732E−06 | −3.5130E−07 | −9.1284E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from TABLE 3 and TABLE 4 as the following values and satisfy the following conditions:

| 2nd Embodiment | | | |
|---|---|---|---|
| f (mm) | 4.37 | CTmin/CLTmax | 6.35 |
| Fno | 1.98 | ImgH/Rlast | 2.17 |
| HFOV (deg.) | 38.4 | TL/ImgH | 1.49 |
| CRA1.0Y (deg.) | 35.2 | f/|CLT_Sagmax| | 8.62 |

-continued

| 2nd Embodiment | | | |
|---|---|---|---|
| CLT (µm) | 20.0 | SD11/SDmax | 0.41 |
| CLTmax (µm) | 52.6 | SDmax/EPD | 1.22 |
| CLTmax/CLTedge | 1.49 | |(CLTR1 + CLTR2)/ (CLTR1 − CLTR2)| | 3.07 |
| CLTmax/CLT | 2.63 | | |

Furthermore, in the photographing optical lens system according to the 2nd embodiment, each Abbe number of the second lens element 220 and the fourth lens element 240 is 19.5, each of which is greater than 15.0 and smaller than 22.0.

3rd Embodiment

Figure 5:
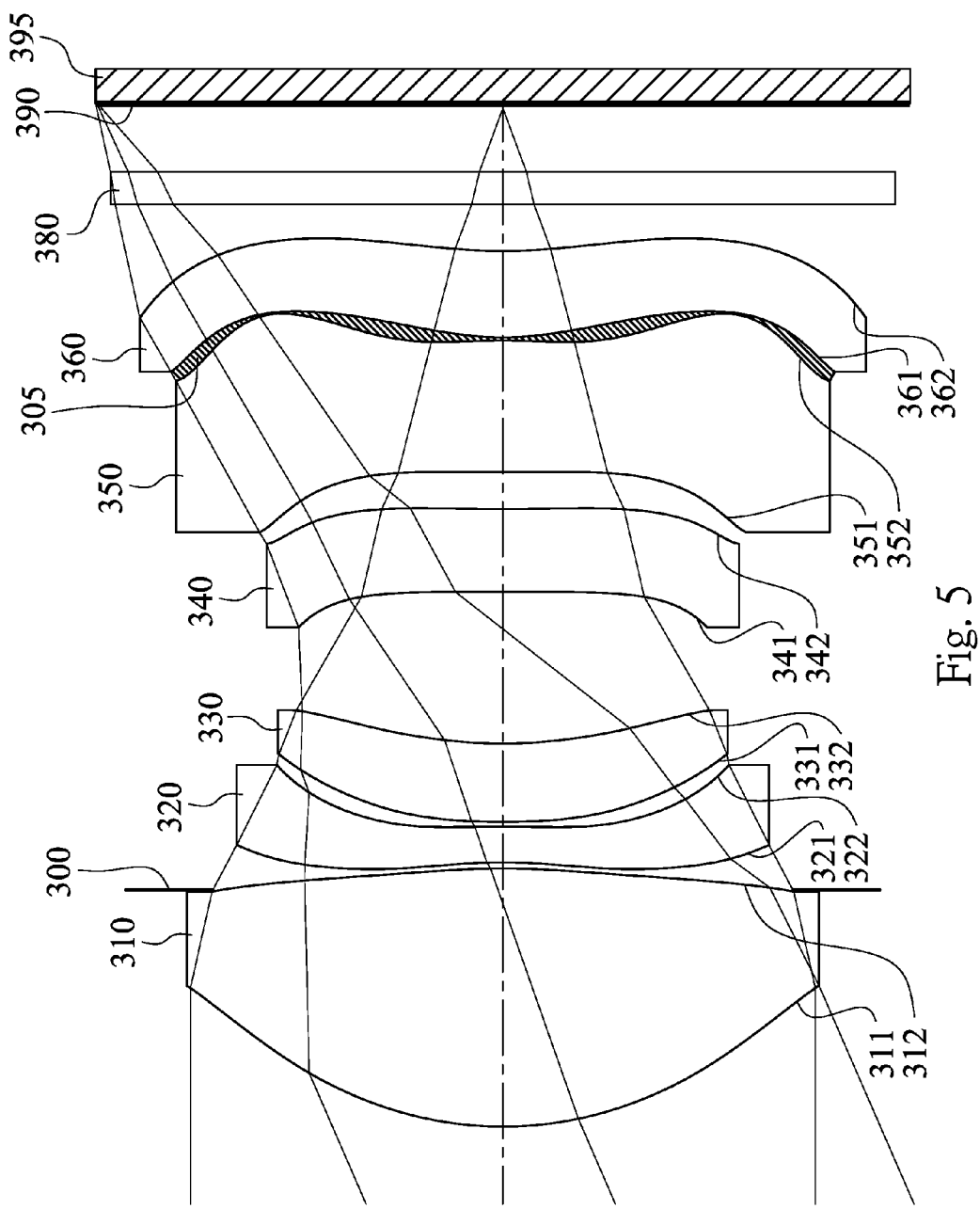
FIG. 5 is a schematic view of an image capturing apparatus according to the 3rd embodiment of the present disclosure.
Figure 6:
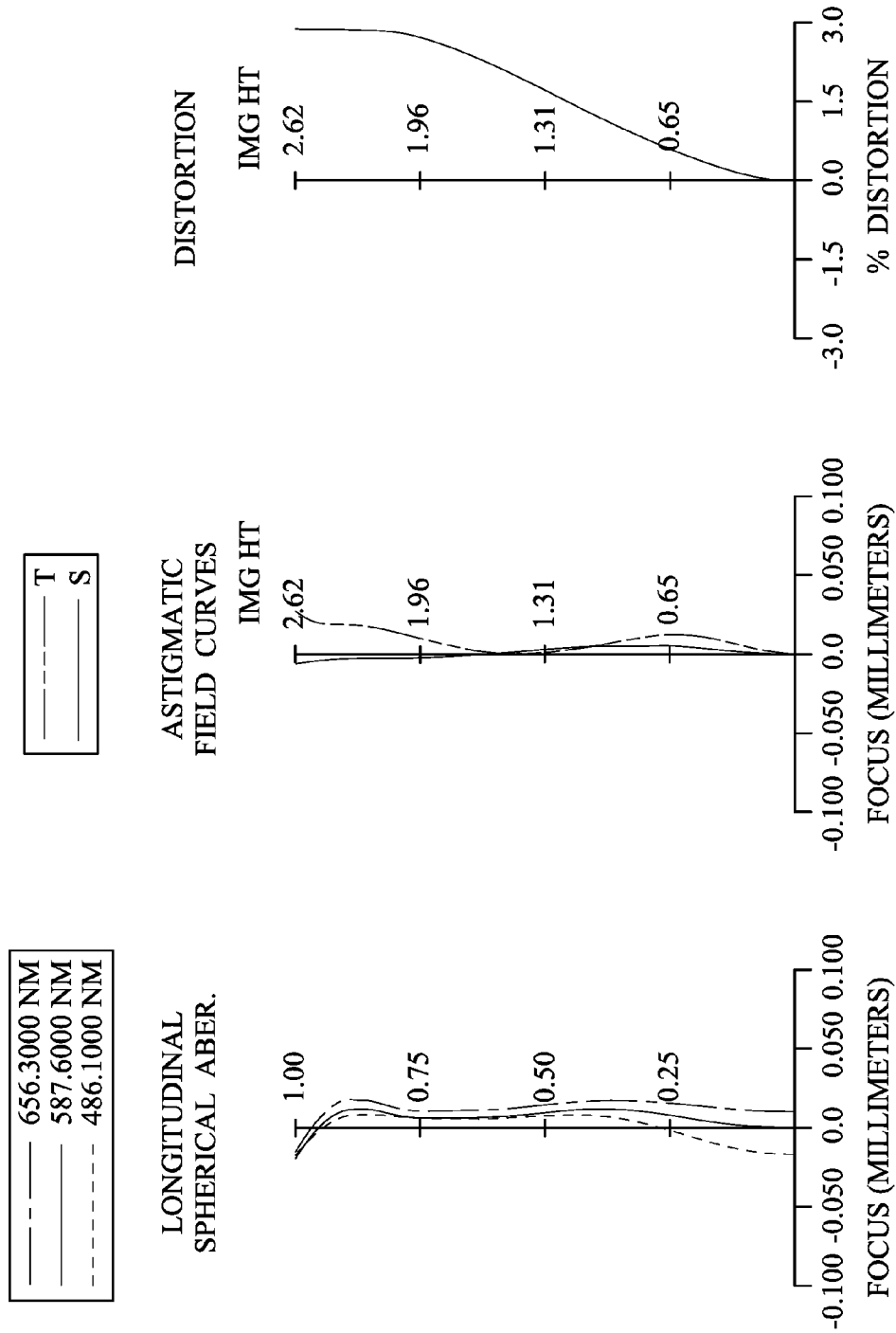
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows, in order from left to right, spherical aberration curves, astigmatic field curves and a distortion curve of the image capturing apparatus according to the 3rd embodiment. In FIG. 5, the image capturing apparatus includes a photographing optical lens system (its reference numeral is omitted) and an image sensor 395. The photographing optical lens system includes, in order from an object side to an image side, a first lens element 310, an aperture stop 300, a second lens element 320, a third lens element 330, a fourth lens element 340, a fifth lens element 350, a cemented layer 305, a sixth lens element 360, an IR-cut filter 380 and an image surface 390. The image sensor 395 is disposed on the image surface 390 of the photographing optical lens system. The photographing optical lens system has a total of six lens elements (310-360).

The first lens element 310 with positive refractive power has a convex object-side surface 311 and a convex image-side surface 312. The first lens element 310 is made of a plastic material, and has the object-side surface 311 and the image-side surface 312 being both aspheric.

The second lens element 320 with negative refractive power has a concave object-side surface 321 and a convex image-side surface 322. The second lens element 320 is made of a plastic material, and has the object-side surface 321 and the image-side surface 322 being both aspheric.

The third lens element 330 with negative refractive power has a convex object-side surface 331 and a concave image-side surface 332. The third lens element 330 is made of a plastic material, and has the object-side surface 331 and the image-side surface 332 being both aspheric.

The fourth lens element 340 with negative refractive power has a convex object-side surface 341 and a concave image-side surface 342. The fourth lens element 340 is made of a plastic material, and has the object-side surface 341 and the image-side surface 342 being both aspheric.

The fifth lens element 350 with positive refractive power has a convex object-side surface 351 and a convex image-side surface 352. The fifth lens element 350 is made of a plastic material, and has the object-side surface 351 and the image-side surface 352 being both aspheric. Furthermore, the image-side surface 352 of the fifth lens element 350 includes at least one critical point.

The sixth lens element 360 with positive refractive power has a convex object-side surface 361 and a concave image-side surface 362. The sixth lens element 360 is made of a plastic material, and has the object-side surface 361 and the image-side surface 362 being both aspheric. Furthermore, the object-side surface 361 of the sixth lens element 360 includes at least one critical point.

The IR-cut filter 380 is made of a glass material and located between the sixth lens element 360 and the image surface 390, and will not affect the focal length of the photographing optical lens system.

In the photographing optical lens system according to the 3rd embodiment, the photographing optical lens system includes a cemented lens group (its reference numeral is omitted), wherein the cemented lens group is cemented by the fifth lens element 350 and the sixth lens element 360 adjacent to each other. Specifically, the cemented lens group includes, in order from the object side to the image side, a first cemented lens element (i.e., the fifth lens element 350), the cemented layer 305 and a second cemented lens element (i.e., the sixth lens element 360). The first cemented lens element has a cemented image-side surface (i.e., the image-side surface 352). The second cemented lens element has a cemented object-side surface (i.e., the object-side surface 361). The cemented layer 305 has a cemented object-side surface (its reference numeral is omitted) and a cemented image-side surface (its reference numeral is omitted). The cemented object-side surface of the cemented layer 305 is cemented with the cemented image-side surface of the first cemented lens element, and the cemented image-side surface of the cemented layer 305 is cemented with the cemented object-side surface of the second cemented lens element. Moreover, each of the image-side surface 352 of the fifth lens element 350 and the object-side surface 361 of the sixth lens element 360 includes at least one critical point. Accordingly, each of the cemented object-side surface and the cemented image-side surface of the cemented layer 305 includes at least one critical point.

The detailed optical data of the 3rd embodiment are shown in TABLE 5 and the aspheric surface data are shown in TABLE 6 below.

TABLE 5

3rd Embodiment
f = 5.85 mm、Fno = 1.45、HFOV = 23.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.358 | ASP | 1.667 | Plastic | 1.545 | 56.1 | 3.14 |
| 2 | | −4.690 | ASP | −0.139 | | | | |
| 3 | Ape. Stop | Plano | | 0.179 | | | | |
| 4 | Lens 2 | −3.075 | ASP | 0.230 | Plastic | 1.639 | 23.3 | −8.21 |
| 5 | | −7.654 | ASP | 0.030 | | | | |
| 6 | Lens 3 | 5.317 | ASP | 0.506 | Plastic | 1.544 | 56.0 | −14.92 |
| 7 | | 3.105 | ASP | 0.979 | | | | |
| 8 | Lens 4 | 81.381 | ASP | 0.535 | Plastic | 1.660 | 20.4 | −23.74 |
| 9 | | 13.105 | ASP | 0.239 | | | | |
| 10 | Lens 5 | 27.545 | ASP | 0.849 | Plastic | 1.544 | 56.0 | 6.38 |
| 11 | | −3.929 | ASP | 0.020 | Cemented glue | 1.485 | 53.2 | |
| 12 | Lens 6 | 1.961 | ASP | 0.558 | Plastic | 1.584 | 28.2 | 6.79 |

TABLE 5-continued

3rd Embodiment
f = 5.85 mm, Fno = 1.45, HFOV = 23.5 deg.

| Surface # | | Curvature Radius | | Thickness | Material | Index | Abbe # | Focal Length |
|---|---|---|---|---|---|---|---|---|
| 13 | | 3.474 | ASP | 0.300 | | | | |
| 14 | IR-cut filter | Plano | | 0.210 | Glass | 1.517 | 64.2 | — |
| 15 | | Plano | | 0.440 | | | | |
| 16 | Image | Plano | | — | | | | |

Reference wavelength is 587.6 nm (d-line).
The effective radius of the surface 1 is 2.040 mm.
The effective radius of the surface 10 is 1.570 mm.

TABLE 6

Aspheric Coefficients

| Surface # | 1 | 2 | 4 | 5 | 6 | 7 |
|---|---|---|---|---|---|---|
| k = | −1.4698E+00 | 3.9096E+00 | −6.4862E+00 | 1.9182E+01 | −7.2648E+01 | −2.5827E+01 |
| A4 = | 1.1579E−02 | 9.6787E−02 | 1.9013E−01 | 2.8936E−01 | 2.0430E−01 | 6.1095E−02 |
| A6 = | −1.2272E−03 | −5.8725E−02 | −1.2679E−01 | −1.7330E−01 | −1.4086E−01 | −4.1258E−02 |
| A8 = | 7.0730E−04 | 2.1995E−02 | 4.7864E−02 | 5.8288E−02 | 5.5719E−02 | 1.6914E−02 |
| A10 = | −2.3040E−04 | −4.2667E−03 | −8.6898E−03 | −4.7163E−03 | −9.6962E−03 | −6.4765E−03 |
| A12 = | 1.1097E−05 | 3.4395E−04 | 5.9412E−04 | −5.1937E−04 | 5.1909E−04 | 8.8803E−04 |

| Surface # | 8 | 9 | 10 | 11 | 12 | 13 |
|---|---|---|---|---|---|---|
| k = | −9.0000E+01 | 6.7977E+01 | −2.0253E+01 | −5.9978E−01 | −1.7242E+00 | 8.3171E−01 |
| A4 = | −6.4092E−02 | −9.0895E−02 | −7.4824E−02 | 4.5533E−01 | −1.5672E−01 | −9.9047E−02 |
| A6 = | 6.8672E−02 | 6.5432E−02 | 2.7228E−02 | −3.6124E−01 | 7.5520E−02 | 3.8034E−02 |
| A8 = | −1.3426E−01 | −8.2094E−02 | −5.8938E−02 | 1.5594E−01 | −2.1234E−02 | −1.6674E−02 |
| A10 = | 1.2581E−01 | 6.0292E−02 | 5.4251E−02 | −4.1667E−02 | −8.3404E−05 | 5.3516E−03 |
| A12 = | −6.5284E−02 | −2.5196E−02 | −2.3865E−02 | 5.9315E−03 | 1.6587E−03 | −1.1072E−03 |
| A14 = | 1.2988E−02 | 4.3151E−03 | 3.9876E−03 | −3.2942E−04 | −4.1157E−04 | 1.2494E−04 |
| A16 = | | | | | 3.3167E−05 | −5.9017E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from TABLE 5 and TABLE 6 as the following values and satisfy the following conditions:

| 3rd Embodiment | | | |
|---|---|---|---|
| f (mm) | 5.85 | CTmin/CLTmax | 4.65 |
| Fno | 1.45 | ImgH/Rlast | 0.75 |
| HFOV (deg.) | 23.5 | TL/ImgH | 2.52 |
| CRA1.0Y (deg.) | 24.6 | f/|CLT_Sagmax| | 22.29 |
| CLT (μm) | 20.0 | SD11/SDmax | 0.87 |
| CLTmax (μm) | 120.0 | SDmax/EPD | 0.58 |
| CLTmax/CLTedge | 1.43 | |(CLTR1 + CLTR2)/(CLTR1 − CLTR2)| | 0.33 |
| CLTmax/CLT | 6.00 | | |

Furthermore, in the photographing optical lens system according to the 3rd embodiment, an Abbe number of the fourth lens element 340 is 20.4, which is greater than 15.0 and smaller than 22.0.

4th Embodiment

Figure 7:
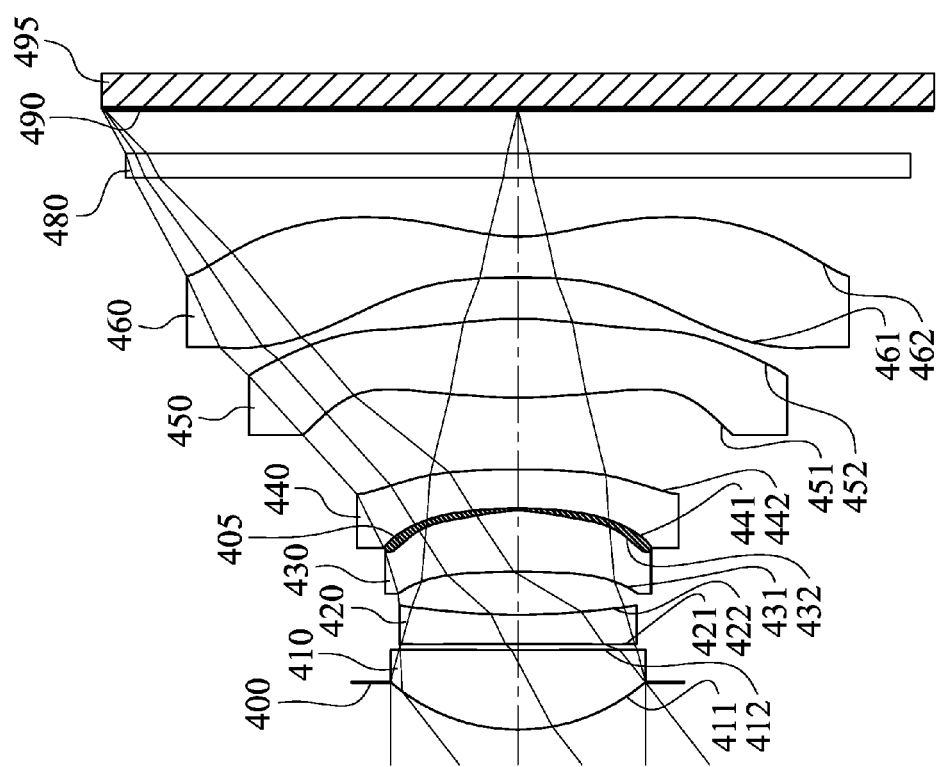
FIG. 7 is a schematic view of an image capturing apparatus according to the 4th embodiment of the present disclosure.
Figure 8:
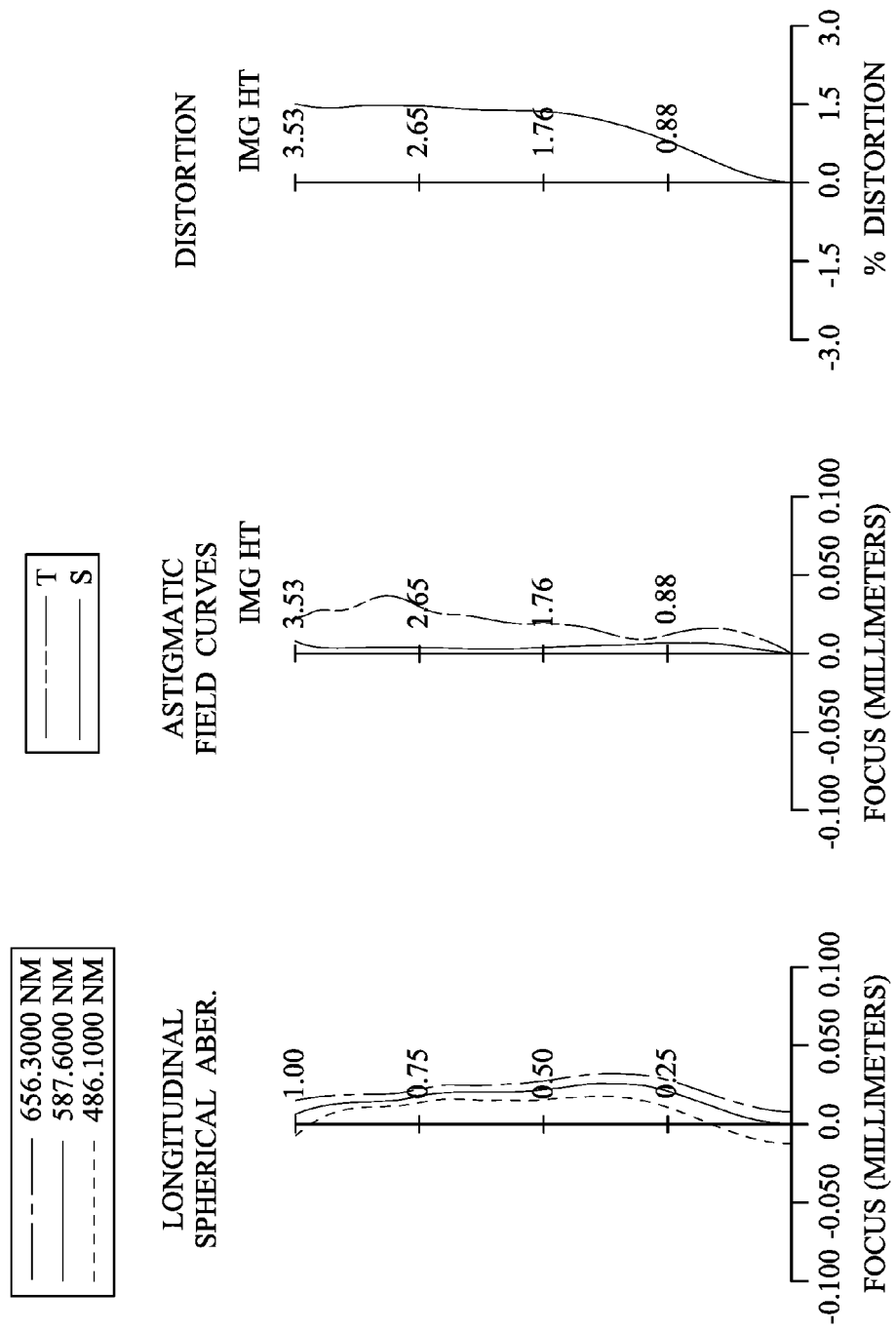
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows, in order from left to right, spherical aberration curves, astigmatic field curves and a distortion curve of the image capturing apparatus according to the 4th embodiment. In FIG. 7, the image capturing apparatus includes a photographing optical lens system (its reference numeral is omitted) and an image sensor 495. The photographing optical lens system includes, in order from an object side to an image side, an aperture stop 400, a first lens element 410, a second lens element 420, a third lens element 430, a cemented layer 405, a fourth lens element 440, a fifth lens element 450, a sixth lens element 460, an IR-cut filter 480 and an image surface 490. The image sensor 495 is disposed on the image surface 490 of the photographing optical lens system. The photographing optical lens system has a total of six lens elements (410-460). Moreover, each of the lens element closest to an imaged object (i.e., the first lens element 410) and the lens element closest to the image surface 490 (i.e., the sixth lens element 460) is a single and non-cemented lens element.

The first lens element 410 with positive refractive power has a convex object-side surface 411 and a concave image-side surface 412. The first lens element 410 is made of a plastic material, and has the object-side surface 411 and the image-side surface 412 being both aspheric.

The second lens element 420 with negative refractive power has a convex object-side surface 421 and a concave image-side surface 422. The second lens element 420 is made of a plastic material, and has the object-side surface 421 and the image-side surface 422 being both aspheric.

The third lens element 430 with positive refractive power has a concave object-side surface 431 and a convex image-side surface 432. The third lens element 430 is made of a plastic material, and has the object-side surface 431 and the image-side surface 432 being both aspheric. Furthermore, the image-side surface 432 of the third lens element 430 includes at least one critical point.

The fourth lens element 440 with negative refractive power has a concave object-side surface 441 and a convex image-side surface 442. The fourth lens element 440 is made of a plastic material, and has the object-side surface 441 and the image-side surface 442 being both aspheric.

The fifth lens element 450 with positive refractive power has a convex object-side surface 451 and a convex image-side surface 452. The fifth lens element 450 is made of a plastic material, and has the object-side surface 451 and the image-side surface 452 being both aspheric.

The sixth lens element 460 with negative refractive power has a concave object-side surface 461 and a concave image-side surface 462. The sixth lens element 460 is made of a plastic material, and has the object-side surface 461 and the image-side surface 462 being both aspheric.

The IR-cut filter 480 is made of a glass material and located between the sixth lens element 460 and the image surface 490, and will not affect the focal length of the photographing optical lens system.

In the photographing optical lens system according to the 4th embodiment, the photographing optical lens system includes a cemented lens group (its reference numeral is omitted), wherein the cemented lens group is cemented by the third lens element 430 and the fourth lens element 440 adjacent to each other. Specifically, the cemented lens group includes, in order from the object side to the image side, a first cemented lens element (i.e., the third lens element 430), the cemented layer 405 and a second cemented lens element (i.e., the fourth lens element 440). The first cemented lens element has a cemented image-side surface (i.e., the image-side surface 432). The second cemented lens element has a cemented object-side surface (i.e., the object-side surface 441). The cemented layer 405 has a cemented object-side surface (its reference numeral is omitted) and a cemented image-side surface (its reference numeral is omitted). The cemented object-side surface of the cemented layer 405 is cemented with the cemented image-side surface of the first cemented lens element, and the cemented image-side surface of the cemented layer 405 is cemented with the cemented object-side surface of the second cemented lens element. Moreover, the image-side surface 432 of the third lens element 430 includes at least one critical point. Accordingly, the cemented object-side surface of the cemented layer 405 includes at least one critical point.

The detailed optical data of the 4th embodiment are shown in TABLE 7 and the aspheric surface data are shown in TABLE 8 below.

TABLE 7

4th Embodiment
f = 4.45 mm、Fno = 2.05、HFOV = 37.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.403 | | | | |
| 2 | Lens 1 | 1.667 | ASP | 0.677 | Plastic | 1.515 | 56.5 | 3.44 |
| 3 | | 24.905 | ASP | 0.051 | | | | |
| 4 | Lens 2 | 24.791 | ASP | 0.250 | Plastic | 1.639 | 23.3 | −9.73 |
| 5 | | 4.951 | ASP | 0.369 | | | | |
| 6 | Lens 3 | −7.963 | ASP | 0.519 | Plastic | 1.559 | 40.4 | 2.28 |
| 7 | | −1.126 | ASP | 0.020 | Cemented glue | 1.485 | 53.2 | |
| 8 | Lens 4 | −3.825 | ASP | 0.330 | Plastic | 1.660 | 20.4 | −7.59 |
| 9 | | −16.710 | ASP | 0.616 | | | | |
| 10 | Lens 5 | 5.851 | ASP | 0.670 | Plastic | 1.544 | 56.0 | 3.71 |
| 11 | | −2.954 | ASP | 0.350 | | | | |
| 12 | Lens 6 | −10.255 | ASP | 0.350 | Plastic | 1.544 | 56.0 | −2.43 |
| 13 | | 1.539 | ASP | 0.500 | | | | |
| 14 | IR-cut filter | Plano | | 0.210 | Glass | 1.517 | 64.2 | — |
| 15 | | Plano | | 0.376 | | | | |
| 16 | Image | Plano | | — | | | | |

Reference wavelength is 587.6 nm (d-line).
The effective radius of the surface 6 is 1.020 mm.

TABLE 8

Aspheric Coefficients

| Surface # | 2 | 3 | 4 | 5 | 6 | 7 |
|---|---|---|---|---|---|---|
| k = | 2.7658E−01 | −8.9884E+01 | −6.1014E+01 | −1.0000E+00 | −8.6758E+01 | −8.8179E+00 |
| A4 = | −1.2352E−02 | −6.1851E−02 | −1.0221E−01 | −5.8484E−02 | −6.7658E−02 | 4.5789E−01 |
| A6 = | 3.5286E−02 | 8.9553E−02 | 1.7541E−01 | 9.5973E−02 | −7.2631E−02 | −2.7697E−01 |

TABLE 8-continued

| Aspheric Coefficients | | | | | | |
|---|---|---|---|---|---|---|
| A8 = | −7.2742E−02 | −3.8325E−02 | −1.6932E−01 | −1.3966E−01 | 5.3803E−02 | −2.6892E+00 |
| A10 = | 6.8468E−02 | −2.4220E−02 | 1.2574E−01 | 1.5509E−01 | −3.0774E−02 | 7.0061E+00 |
| A12 = | −2.6532E−02 | 1.7584E−02 | −7.9052E−02 | −1.1607E−01 | −4.9395E−02 | −8.1782E+00 |
| A14 = | | | 3.1403E−02 | 3.9925E−02 | 4.2008E−02 | 4.6002E+00 |
| A16 = | | | | | | −9.7228E−01 |

| Surface # | 8 | 9 | 10 | 11 | 12 | 13 |
|---|---|---|---|---|---|---|
| k = | −8.8038E+01 | −8.8196E+00 | −5.2882E+01 | −3.4997E+01 | −5.3063E+00 | −8.6899E+00 |
| A4 = | −1.7681E−01 | −1.5099E−01 | 2.8535E−02 | 8.0390E−03 | −1.6384E−01 | −9.5308E−02 |
| A6 = | 4.8910E−01 | 1.6741E−01 | −3.8680E−02 | 4.3712E−02 | 9.1572E−02 | 4.5506E−02 |
| A8 = | −1.9527E+00 | −2.3455E−01 | 2.0781E−02 | −4.0323E−02 | −2.8082E−02 | −1.5936E−02 |
| A10 = | 3.8324E+00 | 2.4633E−01 | −1.5726E−02 | 1.3398E−02 | 5.6510E−03 | 3.6268E−03 |
| A12 = | −4.0636E+00 | −1.5182E−01 | 5.5300E−03 | −2.1357E−03 | −7.1927E−04 | −4.9849E−04 |
| A14 = | 2.2516E+00 | 5.0316E−02 | −8.0039E−04 | 1.6372E−04 | 5.1671E−05 | 3.6950E−05 |
| A16 = | −5.1442E−01 | −6.8077E−03 | 4.0215E−05 | −4.8514E−06 | −1.5831E−06 | −1.1186E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from TABLE 7 and TABLE 8 as the following values and satisfy the following conditions:

| 4th Embodiment | | | |
|---|---|---|---|
| f (mm) | 4.45 | CTmin/CLTmax | 2.89 |
| Fno | 2.05 | ImgH/Rlast | 2.29 |
| HFOV (deg.) | 37.9 | TL/ImgH | 1.50 |
| CRA1.0Y (deg.) | 35.6 | f/|CLT_Sagmax| | 13.17 |
| CLT (Mm) | 20.0 | SD11/SDmax | 0.39 |
| CLTmax (pm) | 114.1 | SDmax/EPD | 1.30 |
| CLTmax/CLTedge | 3.87 | |(CLTR1 + CLTR2)/ (CLTR1 − CLTR2)| | 1.83 |
| CLTmax/CLT | 5.71 | | |

Furthermore, in the photographing optical lens system according to the 4th embodiment, an Abbe number of the fourth lens element 440 is 20.4, which is greater than 15.0 and smaller than 22.0.

5th Embodiment

Figure 9:
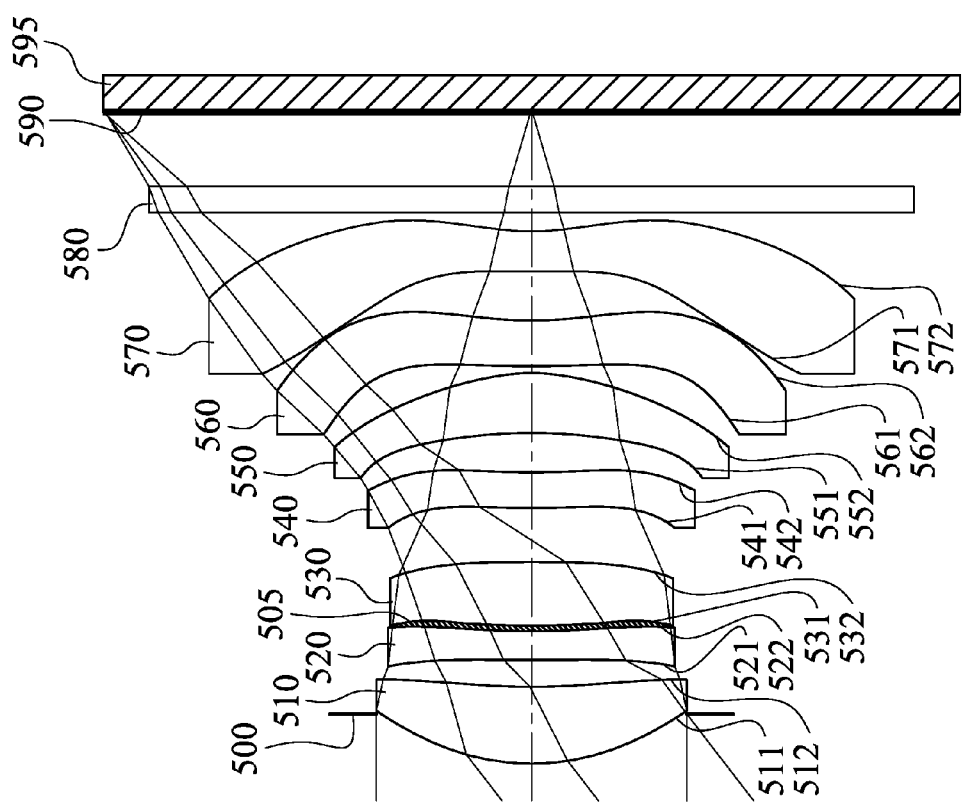
FIG. 9 is a schematic view of an image capturing apparatus according to the 5th embodiment of the present disclosure.
Figure 10:
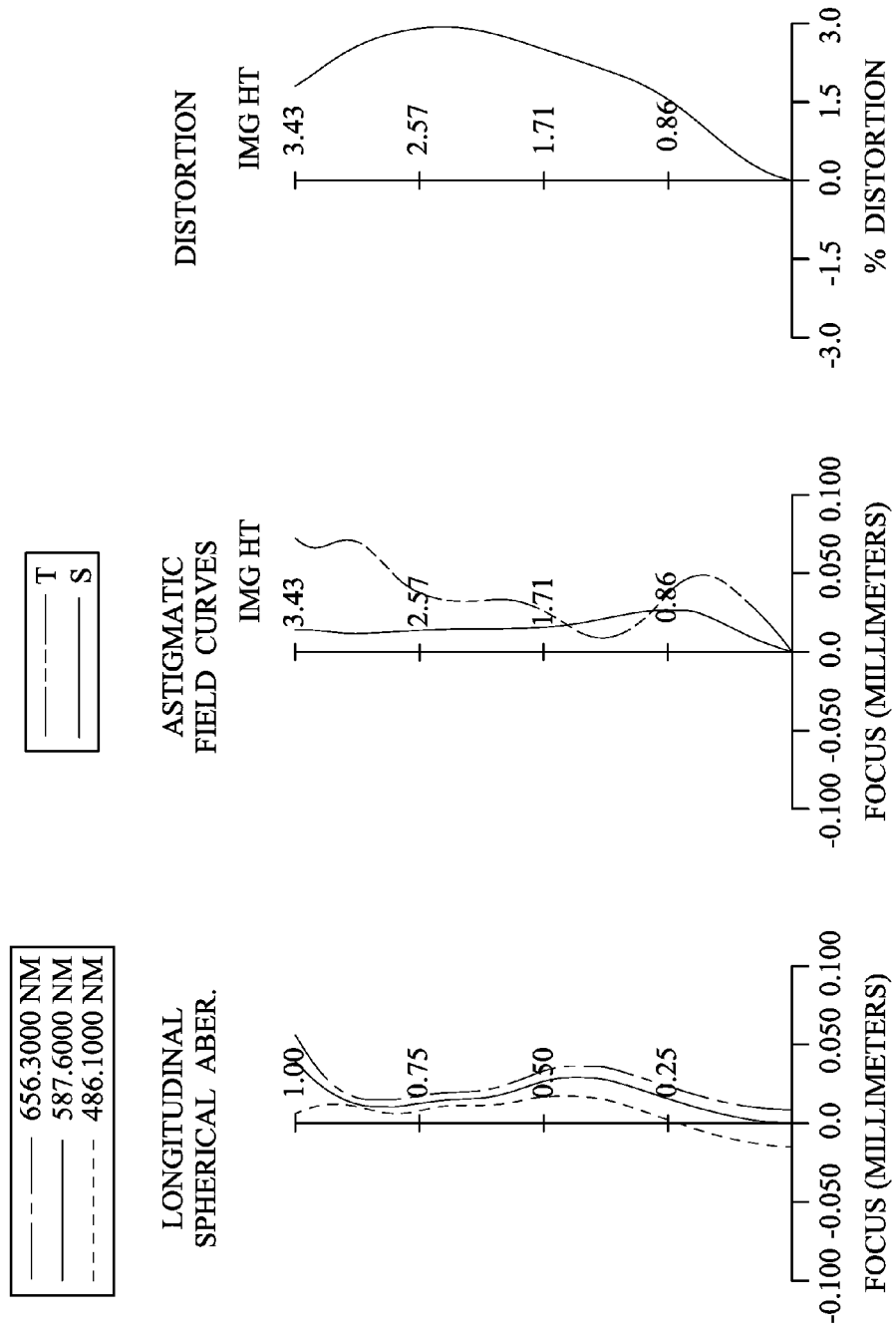
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows, in order from left to right, spherical aberration curves, astigmatic field curves and a distortion curve of the image capturing apparatus according to the 5th embodiment. In FIG. 9, the image capturing apparatus includes a photographing optical lens system (its reference numeral is omitted) and an image sensor 595. The photographing optical lens system includes, in order from an object side to an image side, an aperture stop 500, a first lens element 510, a second lens element 520, a cemented layer 505, a third lens element 530, a fourth lens element 540, a fifth lens element 550, a sixth lens element 560, a seventh lens element 570, an IR-cut filter 580 and an image surface 590. The image sensor 595 is disposed on the image surface 590 of the photographing optical lens system. The photographing optical lens system has a total of seven lens elements (510-570). Moreover, each of the lens element closest to an imaged object (i.e., the first lens element 510) and the lens element closest to the image surface 590 (i.e., the seventh lens element 570) is a single and non-cemented lens element.

The first lens element 510 with positive refractive power has a convex object-side surface 511 and a concave image-side surface 512. The first lens element 510 is made of a plastic material, and has the object-side surface 511 and the image-side surface 512 being both aspheric.

The second lens element 520 with negative refractive power has a convex object-side surface 521 and a concave image-side surface 522. The second lens element 520 is made of a plastic material, and has the object-side surface 521 and the image-side surface 522 being both aspheric. Furthermore, the image-side surface 522 of the second lens element 520 includes at least one critical point.

The third lens element 530 with positive refractive power has a convex object-side surface 531 and a convex image-side surface 532. The third lens element 530 is made of a plastic material, and has the object-side surface 531 and the image-side surface 532 being both aspheric. Furthermore, the object-side surface 531 of the third lens element 530 includes at least one critical point.

The fourth lens element 540 with negative refractive power has a convex object-side surface 541 and a concave image-side surface 542. The fourth lens element 540 is made of a plastic material, and has the object-side surface 541 and the image-side surface 542 being both aspheric.

The fifth lens element 550 with positive refractive power has a concave object-side surface 551 and a convex image-side surface 552. The fifth lens element 550 is made of a plastic material, and has the object-side surface 551 and the image-side surface 552 being both aspheric.

The sixth lens element 560 with negative refractive power has a convex object-side surface 561 and a concave image-side surface 562. The sixth lens element 560 is made of a plastic material, and has the object-side surface 561 and the image-side surface 562 being both aspheric.

The seventh lens element 570 with negative refractive power has a convex object-side surface 571 and a concave image-side surface 572. The seventh lens element 570 is made of a plastic material, and has the object-side surface 571 and the image-side surface 572 being both aspheric.

The IR-cut filter 580 is made of a glass material and located between the seventh lens element 570 and the image surface 590, and will not affect the focal length of the photographing optical lens system.

In the photographing optical lens system according to the 5th embodiment, the photographing optical lens system includes a cemented lens group (its reference numeral is omitted), wherein the cemented lens group is cemented by the second lens element 520 and the third lens element 530 adjacent to each other. Specifically, the cemented lens group includes, in order from the object side to the image side, a first cemented lens element (i.e., the second lens element 520), the cemented layer 505 and a second cemented lens element (i.e., the third lens element 530). The first cemented lens element has a cemented image-side surface (i.e., the image-side surface 522). The second cemented lens element has a cemented object-side surface (i.e., the object-side surface 531). The cemented layer 505 has a cemented object-side surface (its reference numeral is omitted) and a cemented image-side surface (its reference numeral is omitted). The cemented object-side surface of the cemented layer 505 is cemented with the cemented image-side surface of the first cemented lens element, and the cemented image-side surface of the cemented layer 505 is cemented with the cemented object-side surface of the second cemented lens element. Moreover, each of the image-side surface 522 of the second lens element 520 and the object-side surface 531 of the third lens element 530 includes at least one critical point. Accordingly, each of the cemented object-side surface and the cemented image-side surface of the cemented layer 505 includes at least one critical point.

The detailed optical data of the 5th embodiment are shown in TABLE 9 and the aspheric surface data are shown in TABLE 10 below.

TABLE 9

5th Embodiment
f = 4.36 mm、Fno = 1.75、HFOV = 37.6 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.400 | | | | |
| 2 | Lens 1 | 1.898 ASP | 0.618 | Plastic | 1.545 | 56.1 | 4.85 |
| 3 | | 5.967 ASP | 0.216 | | | | |
| 4 | Lens 2 | 32.829 ASP | 0.230 | Plastic | 1.671 | 19.5 | −10.87 |
| 5 | | 5.950 ASP | 0.044 | Cemented glue | 1.485 | 53.2 | |
| 6 | Lens 3 | 6.093 ASP | 0.514 | Plastic | 1.544 | 56.0 | 8.19 |
| 7 | | −16.053 ASP | 0.434 | | | | |
| 8 | Lens 4 | 6.262 ASP | 0.286 | Plastic | 1.671 | 19.5 | −108.77 |
| 9 | | 5.661 ASP | 0.318 | | | | |
| 10 | Lens 5 | −3.912 ASP | 0.481 | Plastic | 1.584 | 28.2 | 4.16 |
| 11 | | −1.568 ASP | 0.055 | | | | |
| 12 | Lens 6 | 9.901 ASP | 0.367 | Plastic | 1.671 | 19.5 | −6.77 |
| 13 | | 3.067 ASP | 0.396 | | | | |
| 14 | Lens 7 | 22.572 ASP | 0.320 | Plastic | 1.544 | 56.0 | −4.16 |
| 15 | | 2.045 ASP | 0.150 | | | | |
| 16 | IR-cut filter | Plano | 0.210 | Glass | 1.517 | 64.2 | — |
| 17 | | Plano | 0.601 | | | | |
| 18 | Image | Plano | — | | | | |

Reference wavelength is 587.6 nm (d-line).
The effective radius of the surface 8 is 1.150 mm.

TABLE 10

Aspheric Coefficients

| Surface # | 2 | 3 | 4 | 5 | 6 | 7 | 8 |
|---|---|---|---|---|---|---|---|
| k = | 8.4420E−02 | −1.8084E+01 | −3.7458E+00 | −6.0000E−01 | −9.0000E+01 | −2.1311E+01 | −1.0000E+00 |
| A4 = | −1.6743E−02 | −1.7671E−02 | −3.5699E−02 | 6.0767E−03 | 2.1919E−01 | −6.9165E−02 | −1.6932E−01 |
| A6 = | 6.1971E−02 | 7.6497E−02 | −2.5595E−02 | −6.7372E−01 | −2.8393E+00 | 4.3024E−02 | 1.3975E−01 |
| A8 = | −2.5723E−01 | −4.5836E−01 | 3.2957E−03 | 3.2225E+00 | 1.3821E+01 | −4.6999E−02 | −4.8866E−01 |
| A10 = | 5.8200E−01 | 1.2402E+00 | 1.2063E−01 | −7.6390E+00 | −3.3284E+01 | 4.1304E−02 | 1.0145E+00 |
| A12 = | −8.0766E−01 | −1.9505E+00 | −3.0402E−01 | 1.0015E+01 | 4.4732E+01 | −4.8105E−02 | −1.2435E+00 |
| A14 = | 6.8662E−01 | 1.8488E+00 | 3.9570E−01 | −7.5073E+00 | −3.5344E+01 | 3.3838E−02 | 9.0118E−01 |
| A16 = | −3.4829E−01 | −1.0311E+00 | −2.8100E−01 | 3.1493E+00 | 1.6283E+01 | −7.1159E−02 | −3.7901E−01 |
| A18 = | 9.6354E−02 | 3.0941E−01 | 9.9193E−02 | −6.7478E−01 | −4.0294E+00 | −2.3823E−03 | 8.4437E−02 |
| A20 = | −1.1144E−02 | −3.8339E−02 | −1.3428E−02 | 5.6485E−02 | 4.1172E−01 | 8.2024E−04 | −7.6092E−03 |

| Surface # | 9 | 10 | 11 | 12 | 13 | 14 | 15 |
|---|---|---|---|---|---|---|---|
| k = | −1.6779E−01 | −2.1368E+01 | −1.0873E+01 | −1.0000E+00 | −1.2351E+00 | −1.0000E+00 | −7.9326E+00 |
| A4 = | −1.0831E−01 | −4.1538E−02 | −1.4783E−01 | −1.3122E−02 | −9.9742E−02 | −1.7080E−01 | −1.3723E−01 |
| A6 = | −4.6480E−02 | 1.9065E−01 | 3.5645E−01 | −7.1094E−02 | −1.5118E−03 | −1.7331E−02 | 4.4809E−02 |
| A8 = | 1.6676E−01 | −4.6731E−01 | −5.8079E−01 | 4.6661E−03 | 6.0940E−03 | 6.4633E−03 | −3.0215E−03 |
| A10 = | −3.4514E−01 | 5.7741E−01 | 5.6269E−01 | 3.8062E−02 | 2.7301E−03 | −3.1081E−02 | −2.7383E−03 |
| A12 = | 4.5539E−01 | −4.3318E−01 | −3.2910E−01 | −2.6288E−02 | −3.4494E−03 | 7.5051E−03 | 1.0412E−03 |
| A14 = | −3.5983E−01 | 2.0658E−01 | 1.1542E−01 | 5.3152E−03 | 1.2004E−03 | −1.0368E−03 | −1.7616E−04 |
| A16 = | 1.6106E−01 | −6.3860E−02 | −2.3495E−02 | 5.1498E−04 | −1.9879E−04 | 8.1867E−05 | 1.5763E−05 |

TABLE 10-continued

| Aspheric Coefficients | | | | | | | |
|---|---|---|---|---|---|---|---|
| A18 = | −3.6914E−02 | 1.1631E−02 | 2.5393E−03 | −2.8926E−04 | 1.6092E−05 | −3.3605E−06 | −7.0075E−07 |
| A20 = | 3.3269E−03 | −9.1730E−04 | −1.1207E−04 | 2.4994E−05 | −5.1032E−07 | 5.2871E−08 | 1.1605E−08 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from TABLE 9 and TABLE 10 as the following values and satisfy the following conditions:

| 5th Embodiment | | | |
|---|---|---|---|
| f (mm) | 4.36 | CTmin/CLTmax | 4.62 |
| Fno | 1.75 | ImgH/Rlast | 1.68 |
| HFOV (deg.) | 37.6 | TL/ImgH | 1.53 |
| CRA1.0Y (deg.) | 36.7 | f/|CLT_Sagmax| | 155.52 |
| CLT (μm) | 44.0 | SD11/SDmax | 0.48 |
| CLTmax (μm) | 49.8 | SDmax/EPD | 1.04 |
| CLTmax/CLTedge | 2.57 | |(CLTR1 + CLTR2)/(CLTR1 − CLTR2)| | 84.40 |
| CLTmax/CLT | 1.13 | | |

Furthermore, in the photographing optical lens system according to the 5th embodiment, each Abbe number of the second lens element 520, the fourth lens element 540 and the sixth lens element 560 is 19.5, each of which is greater than 15.0 and smaller than 22.0.

6th Embodiment

Figure 11:
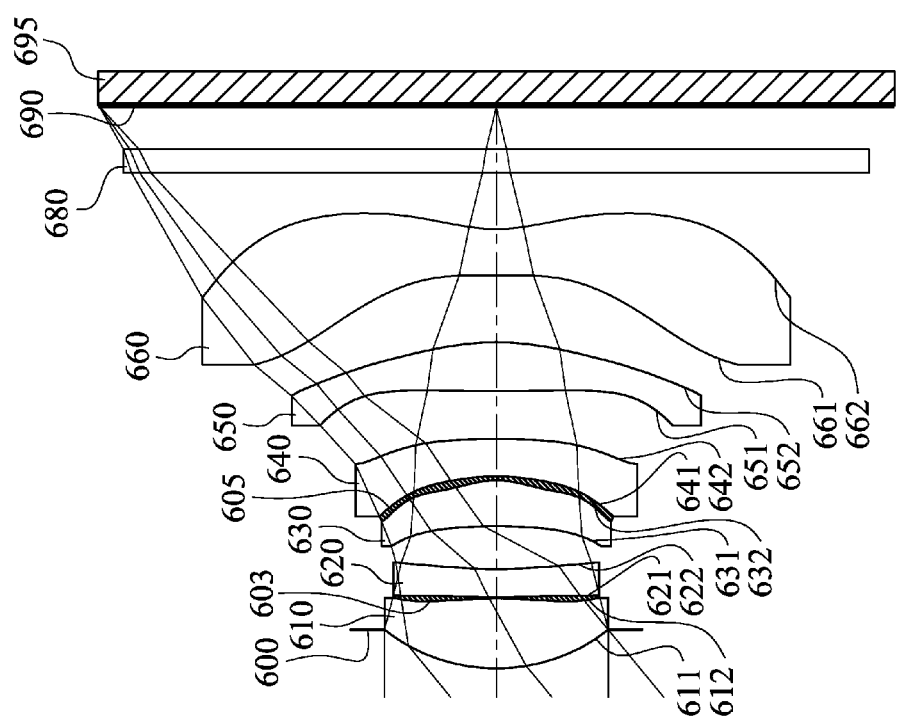
FIG. 11 is a schematic view of an image capturing apparatus according to the 6th embodiment of the present disclosure.
Figure 12:
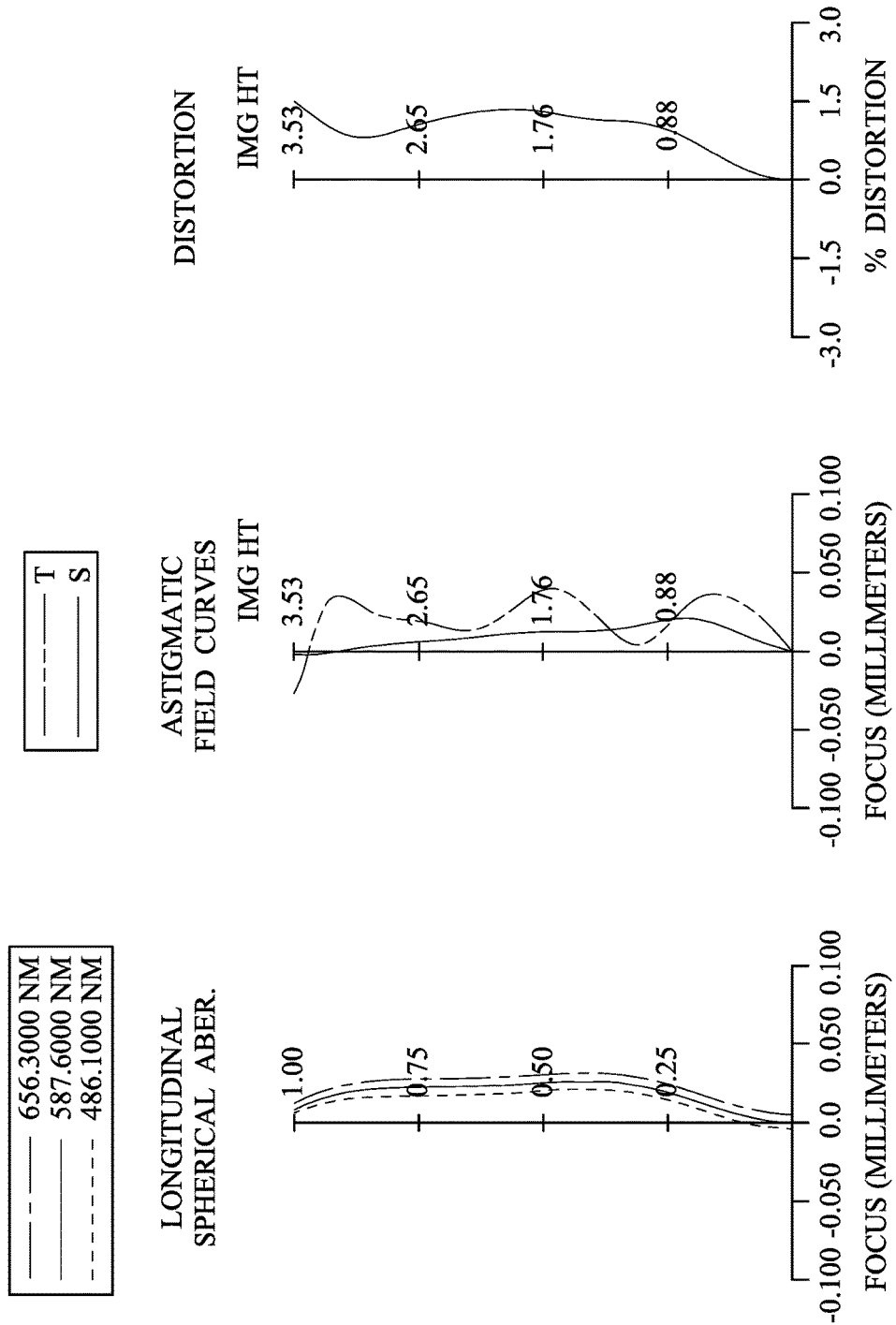
FIG. 12 shows spherical aberration curves, astigmatic field curves and a distortion curve of the image capturing apparatus according to the 6th to embodiment.

FIG. 11 is a schematic view of an image capturing apparatus according to the 6th embodiment of the present disclosure. FIG. 12 shows, in order from left to right, spherical aberration curves, astigmatic field curves and a distortion curve of the image capturing apparatus according to the 6th embodiment. In FIG. 11, the image capturing apparatus includes a photographing optical lens system (its reference numeral is omitted) and an image sensor 695. The photographing optical lens system includes, in order from an object side to an image side, an aperture stop 600, a first lens element 610, a cemented layer 603, a second lens element 620, a third lens element 630, a cemented layer 605, a fourth lens element 640, a fifth lens element 650, a sixth lens element 660, an IR-cut filter 680 and an image surface 690. The image sensor 695 is disposed on the image surface 690 of the photographing optical lens system. The photographing optical lens system has a total of six lens elements (610-660).

The first lens element 610 with positive refractive power has a convex object-side surface 611 and a convex image-side surface 612. The first lens element 610 is made of a plastic material, and has the object-side surface 611 and the image-side surface 612 being both aspheric. Furthermore, the image-side surface 612 of the first lens element 610 includes at least one critical point.

The second lens element 620 with negative refractive power has a convex object-side surface 621 and a concave image-side surface 622. The second lens element 620 is made of a plastic material, and has the object-side surface 621 and the image-side surface 622 being both aspheric.

The third lens element 630 with positive refractive power has a concave object-side surface 631 and a convex image-side surface 632. The third lens element 630 is made of a plastic material, and has the object-side surface 631 and the image-side surface 632 being both aspheric.

The fourth lens element 640 with negative refractive power has a concave object-side surface 641 and a convex image-side surface 642. The fourth lens element 640 is made of a plastic material, and has the object-side surface 641 and the image-side surface 642 being both aspheric.

The fifth lens element 650 with positive refractive power has a convex object-side surface 651 and a convex image-side surface 652. The fifth lens element 650 is made of a plastic material, and has the object-side surface 651 and the image-side surface 652 being both aspheric.

The sixth lens element 660 with negative refractive power has a convex object-side surface 661 and a concave image-side surface 662. The sixth lens element 660 is made of a plastic material, and has the object-side surface 661 and the image-side surface 662 being both aspheric.

The IR-cut filter 680 is made of a glass material and located between the sixth lens element 660 and the image surface 690, and will not affect the focal length of the photographing optical lens system.

In the photographing optical lens system according to the 6th embodiment, the photographing optical lens system includes two cemented lens groups (reference numerals thereof are omitted), wherein one of the cemented lens groups is cemented by the first lens element 610 and second lens element 620 adjacent to each other, and the other is cemented by the third lens element 630 and the fourth lens element 640 adjacent to each other. The details of the two cemented lens groups are recited as follows.

One of the cemented lens groups includes, in order from the object side to the image side, a first cemented lens element (i.e., the first lens element 610), the cemented layer 603 and a second cemented lens element (i.e., the second lens element 620). The first cemented lens element has a cemented image-side surface (i.e., the image-side surface 612). The second cemented lens element has a cemented object-side surface (i.e., the object-side surface 621). The cemented layer 603 has a cemented object-side surface (its reference numeral is omitted) and a cemented image-side surface (its reference numeral is omitted). The cemented object-side surface of the cemented layer 603 is cemented with the cemented image-side surface of the first cemented lens element, and the cemented image-side surface of the cemented layer 603 is cemented with the cemented object-side surface of the second cemented lens element. Moreover, the image-side surface 612 of the first lens element 610 includes at least one critical point. Accordingly, the cemented object-side surface of the cemented layer 603 includes at least one critical point.

The other of the cemented lens groups includes, in order from the object side to the image side, a first cemented lens element (i.e., the third lens element 630), the cemented layer 605 and a second cemented lens element (i.e., the fourth lens element 640). The first cemented lens element has a cemented image-side surface (i.e., the image-side surface 632). The second cemented lens element has a cemented object-side surface (i.e., the object-side surface 641). The cemented layer 605 has a cemented object-side surface (its reference numeral is omitted) and a cemented image-side surface (its reference numeral is omitted). The cemented object-side surface of the cemented layer 605 is cemented with the cemented image-side surface of the first cemented lens element, and the cemented image-side surface of the cemented layer 605 is cemented with the cemented object-side surface of the second cemented lens element.

The detailed optical data of the 6th embodiment are shown in TABLE 11 and the aspheric surface data are shown in TABLE 12 below.

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again. Particularly, the photographing optical lens system according to the 6th embodiment includes two cemented layers, i.e., the cemented layer 603 and the cemented layer 605. As shown in the following table, each of the parameters of CLT, CLTmax, CLTmax/CLTedge, CLTmax/CLT, CTmin/CLTmax, f/|CLT_Sagmax| and |(CLTR1+CLTR2)/(CLTR1−CLTR2)| has two values, wherein the left one is the value

TABLE 11

6th Embodiment
f = 4.20 mm、Fno = 2.12、HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.344 | | | | |
| 2 | Lens 1 | 1.638 | ASP | 0.619 | Plastic | 1.515 | 56.5 | 2.55 |
| 3 | | −5.759 | ASP | 0.014 | Cemented glue | 1.485 | 53.2 | |
| 4 | Lens 2 | 9.845 | ASP | 0.250 | Plastic | 1.639 | 23.5 | −18.34 |
| 5 | | 5.296 | ASP | 0.380 | | | | |
| 6 | Lens 3 | −4.618 | ASP | 0.408 | Plastic | 1.559 | 40.4 | 1.37 |
| 7 | | −0.677 | ASP | 0.034 | Cemented glue | 1.485 | 53.2 | |
| 8 | Lens 4 | −1.755 | ASP | 0.330 | Plastic | 1.660 | 20.4 | −3.11 |
| 9 | | −12.927 | ASP | 0.426 | | | | |
| 10 | Lens 5 | 16.988 | ASP | 0.434 | Plastic | 1.559 | 40.4 | 3.84 |
| 11 | | −2.436 | ASP | 0.594 | | | | |
| 12 | Lens 6 | 27.836 | ASP | 0.412 | Plastic | 1.544 | 56.0 | −2.74 |
| 13 | | 1.407 | ASP | 0.500 | | | | |
| 14 | IR-cut filter | Plano | | 0.210 | Glass | 1.517 | 64.2 | — |
| 15 | | Plano | | 0.388 | | | | |
| 16 | Image | Plano | | — | | | | |

Reference wavelength is 587.6 nm (d-line).
The effective radius of the surface 9 is 1.250 mm

TABLE 12

Aspheric Coefficients

| Surface # | 2 | 3 | 4 | 5 | 6 | 7 |
|---|---|---|---|---|---|---|
| k = | 3.9950E−01 | 2.2171E+01 | 8.6913E+01 | −1.0000E+00 | −1.6436E+01 | −5.8248E+00 |
| A4 = | −1.4449E−02 | −4.8548E−02 | −1.0827E−01 | −2.3022E−02 | −5.1266E−02 | 7.8332E−01 |
| A6 = | 3.2193E−02 | 2.8071E−01 | 1.3005E−01 | 1.7922E−02 | −8.7070E−02 | −7.4649E−01 |
| A8 = | −6.6983E−02 | 1.7196E−01 | −1.1996E−01 | −9.2928E−02 | −1.2703E−02 | −2.1497E+00 |
| A10 = | 6.7546E−02 | −2.9222E−01 | 8.0454E−02 | 1.3703E−01 | 2.1775E−02 | 5.6298E+00 |
| A12 = | −2.7278E−02 | −1.8977E−04 | −7.7344E−02 | −1.1662E−01 | −4.9965E−02 | −6.6361E+00 |
| A14 = | | | 3.3836E−02 | 3.8446E−02 | 4.2017E−02 | 3.9794E+00 |
| A16 = | | | | | | −8.8087E−01 |

| Surface # | 8 | 9 | 10 | 11 | 12 | 13 |
|---|---|---|---|---|---|---|
| k = | −2.4491E+01 | 8.8815E+01 | 8.9961E+01 | −2.8649E+01 | −9.0000E+01 | −9.4596E+00 |
| A4 = | −6.3890E−02 | −2.0002E−01 | −6.9092E−02 | −1.8419E−01 | −3.8459E−01 | −1.3415E−01 |
| A6 = | −1.0859E−01 | 3.5070E−01 | 1.0804E−01 | 2.8375E−01 | 3.0545E−01 | 7.7800E−02 |
| A8 = | −1.3931E−01 | −6.8616E−01 | −1.3705E−01 | −2.1514E−01 | −1.4779E−01 | −2.9564E−02 |
| A10 = | −2.4470E−01 | 8.1238E−01 | 7.9025E−02 | 4.4245E−02 | 8.5442E−02 | 6.9356E−03 |
| A12 = | 9.5174E−01 | −5.2958E−01 | −2.7350E−02 | −1.7896E−02 | −7.7040E−03 | −9.8723E−04 |
| A14 = | −7.3439E−01 | 1.8022E−01 | 5.6132E−03 | 1.8293E−03 | 7.0906E−04 | 7.6946E−05 |
| A16 = | 1.6281E−01 | −2.3982E−02 | −5.2009E−04 | −7.1560E−05 | −2.6590E−05 | −2.4865E−06 | corresponding to the cemented layer 603, and the right one is the value corresponding to the cemented layer 605.

Moreover, these parameters can be calculated from TABLE 11 and TABLE 12 as the following values and satisfy the following conditions:

| 6th Embodiment | | | |
|---|---|---|---|
| f (mm) | 4.20 | CTmin/CLTmax | 4.90/3.47 |
| Fno | 2.12 | ImgH/Rlast | 2.51 |
| HFOV (deg.) | 39.5 | TL/ImgH | 1.42 |
| CRA1.0Y (deg.) | 35.4 | f/|CLT_Sagmax| | 284.30/11.43 |
| CLT (μm) | 14.0/34.0 | SD11/SDmax | 0.38 |
| CLTmax (μm) | 51.0/72.1 | SDmax/EPD | 1.32 |
| CLTmax/CLTedge | 2.34/1.14 | |(CLTR1 + CLTR2)/(CLTR1 − CLTR2)| | 0.26/2.26 |
| CLTmax/CLT | 3.64/2.12 | | |

Furthermore, in the photographing optical lens system according to the 6th embodiment, an Abbe number of the fourth lens element 640 is 20.4, which is greater than 15.0 and smaller than 22.0.

7th Embodiment

Figure 13:
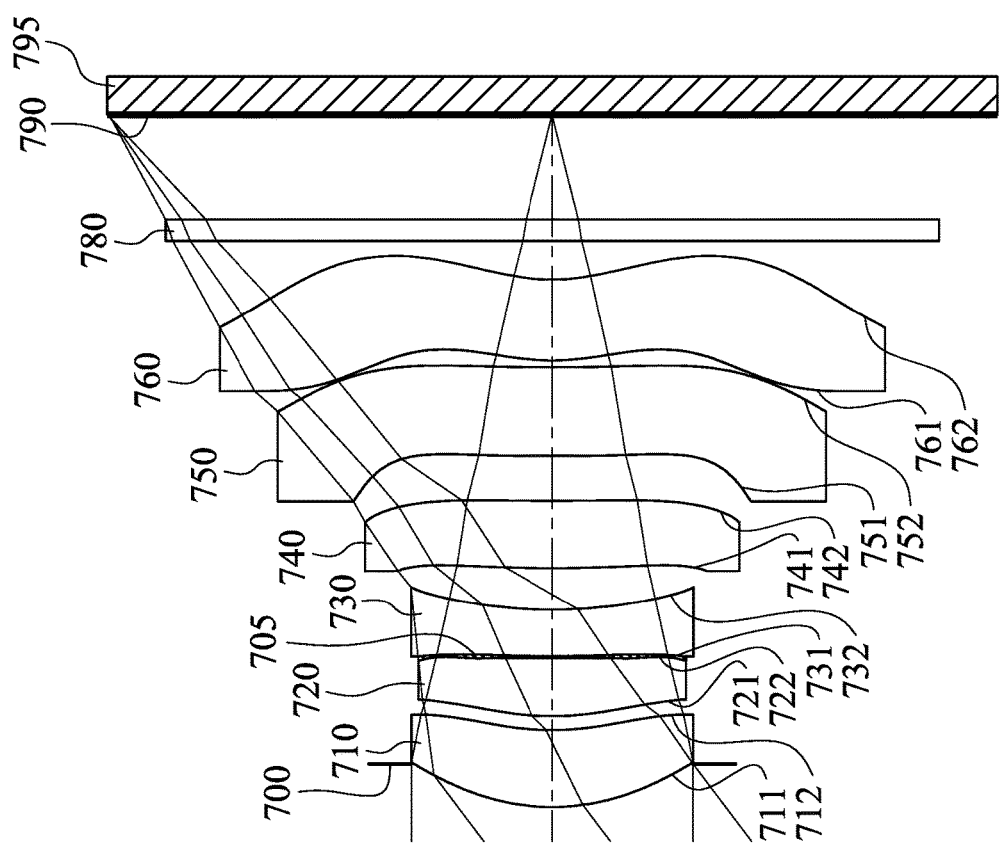
FIG. 13 is a schematic view of an image capturing apparatus according to the 7th embodiment of the present disclosure.
Figure 14:
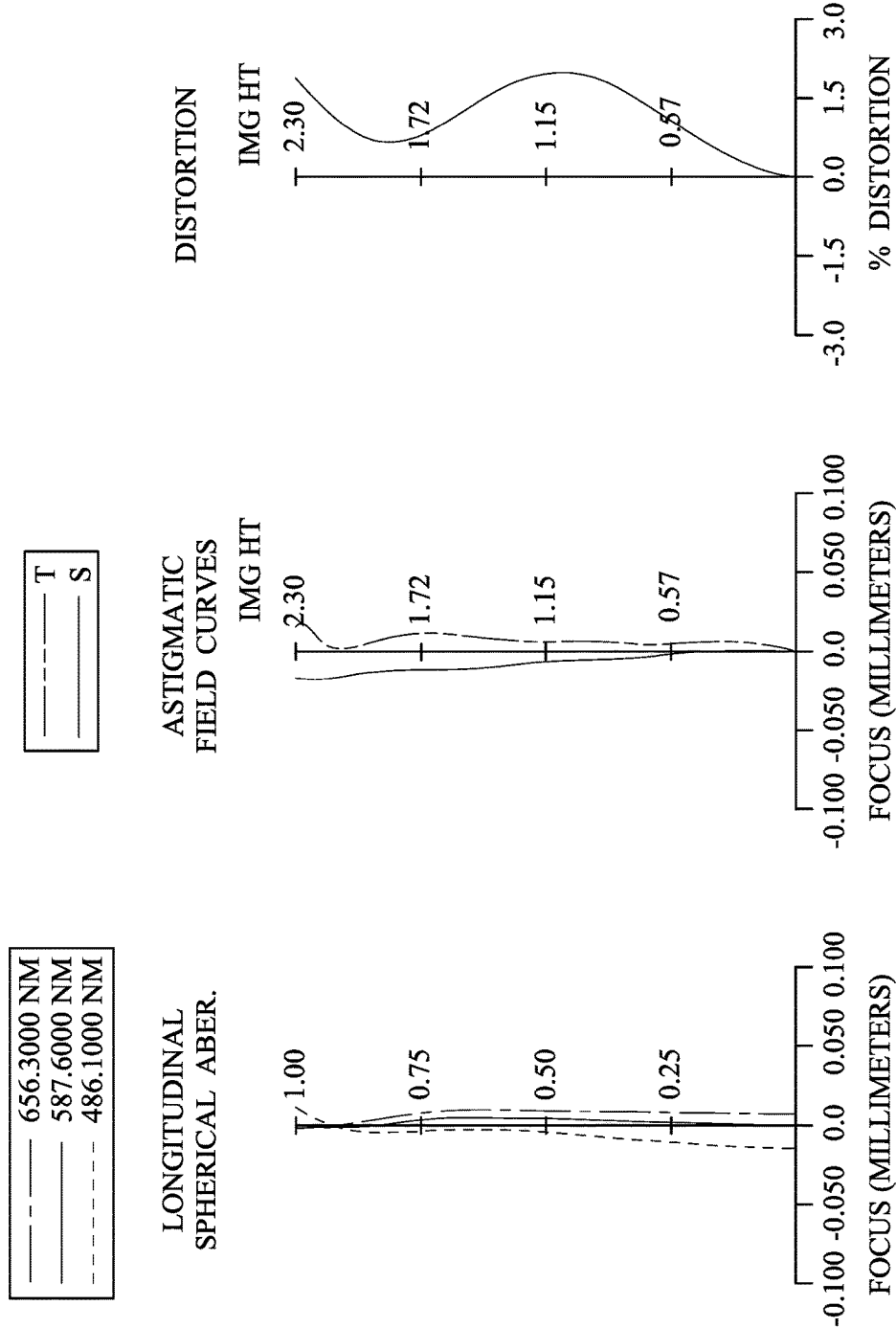
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows, in order from left to right, spherical aberration curves, astigmatic field curves and a distortion curve of the image capturing apparatus according to the 7th embodiment. In FIG. 13, the image capturing apparatus includes a photographing optical lens system (its reference numeral is omitted) and an image sensor 795. The photographing optical lens system includes, in order from an object side to an image side, an aperture stop 700, a first lens element 710, a second lens element 720, a cemented layer 705, a third lens element 730, a fourth lens element 740, a fifth lens element 750, a sixth lens element 760, an IR-cut filter 780 and an image surface 790. The image sensor 795 is disposed on the image surface 790 of the photographing optical lens system. The photographing optical lens system has a total of six lens elements (710-760). Moreover, each of the lens element closest to an imaged object (i.e., the first lens element 710) and the lens element closest to the image surface 790 (i.e., the sixth lens element 760) is a single and non-cemented lens element.

The first lens element 710 with positive refractive power has a convex object-side surface 711 and a concave image-side surface 712. The first lens element 710 is made of a plastic material, and has the object-side surface 711 and the image-side surface 712 being both aspheric.

The second lens element 720 with positive refractive power has a convex object-side surface 721 and a concave image-side surface 722. The second lens element 720 is made of a plastic material, and has the object-side surface 721 and the image-side surface 722 being both aspheric. Furthermore, the image-side surface 722 of the second lens element 720 includes at least one critical point.

The third lens element 730 with negative refractive power has a convex object-side surface 731 and a concave image-side surface 732. The third lens element 730 is made of a plastic material, and has the object-side surface 731 and the image-side surface 732 being both aspheric. Furthermore, the object-side surface 731 of the third lens element 730 includes at least one critical point.

The fourth lens element 740 with positive refractive power has a convex object-side surface 741 and a concave image-side surface 742. The fourth lens element 740 is made of a plastic material, and has the object-side surface 741 and the image-side surface 742 being both aspheric.

The fifth lens element 750 with negative refractive power has a planar object-side surface 751 and a concave image-side surface 752. The fifth lens element 750 is made of a plastic material, and has the object-side surface 751 and the image-side surface 752 being both aspheric.

The sixth lens element 760 with negative refractive power has a convex object-side surface 761 and a concave image-side surface 762. The sixth lens element 760 is made of a plastic material, and has the object-side surface 761 and the image-side surface 762 being both aspheric.

The IR-cut filter 780 is made of a glass material and located between the sixth lens element 760 and the image surface 790, and will not affect the focal length of the photographing optical lens system.

In the photographing optical lens system according to the 7th embodiment, the photographing optical lens system includes a cemented lens group (its reference numeral is omitted), wherein the cemented lens group is cemented by the second lens element 720 and third lens element 730 adjacent to each other. Specifically, the cemented lens group includes, in order from the object side to the image side, a first cemented lens element (i.e., the second lens element 720), the cemented layer 705 and a second cemented lens element (i.e., the third lens element 730). The first cemented lens element has cemented image-side surface (i.e., the image-side surface 722). The second cemented lens element has a cemented object-side surface (i.e., the object-side surface 731). The cemented layer 705 has a cemented object-side surface (its reference numeral is omitted) and a cemented image-side surface (its reference numeral is omitted). The cemented object-side surface of the cemented layer 705 is cemented with the cemented image-side surface of the first cemented lens element, and the cemented image-side surface of the cemented layer 705 is cemented with the cemented object-side surface of the second cemented lens element. Moreover, each of the image-side surface 722 of the second lens element 720 and the object-side surface 731 of the third lens element 730 includes at least one critical point. Accordingly, each of the cemented object-side surface and the cemented image-side surface of the cemented layer 705 includes at least one critical point.

The detailed optical data of the 7th embodiment are shown in TABLE 13 and the aspheric surface data are shown in TABLE 14 below.

TABLE 13

| 7th Embodiment f = 2.99 mm、Fno = 2.05、HFOV = 37.0 deg. | | | | | | |
|---|---|---|---|---|---|---|
| Surface # | | Curvature Radius | Thickness | Material | Index | Abbe # | Focal Length |
| 0 | Object | Plano | Infinity | | | | |
| 1 | Ape. Stop | Plano | −0.223 | | | | |
| 2 | Lens 1 | 1.162 ASP | 0.398 | Plastic | 1.545 | 56.1 | 7.09 |

TABLE 13-continued

7th Embodiment
f = 2.99 mm, Fno = 2.05, HFOV = 37.0 deg.

| Surface # | | Curvature Radius | Thickness | Material | Index | Abbe # | Focal Length |
|---|---|---|---|---|---|---|---|
| 3 | | 1.461 | ASP | 0.072 | | | |
| 4 | Lens 2 | 1.511 | ASP | 0.299 | Plastic | 1.544 | 56.0 | 4.46 |
| 5 | | 3.731 | ASP | 0.012 | Cemented glue | 1.550 | 43.9 | |
| 6 | Lens 3 | 7.208 | ASP | 0.240 | Plastic | 1.650 | 21.5 | −5.87 |
| 7 | | 2.462 | ASP | 0.216 | | | | |
| 8 | Lens 4 | 6.034 | ASP | 0.349 | Plastic | 1.544 | 56.0 | 18.93 |
| 9 | | 14.276 | ASP | 0.232 | | | | |
| 10 | Lens 5 | ∞ | ASP | 0.458 | Plastic | 1.650 | 21.5 | −23.34 |
| 11 | | 15.178 | ASP | 0.035 | | | | |
| 12 | Lens 6 | 1.209 | ASP | 0.421 | Plastic | 1.584 | 28.2 | −49.25 |
| 13 | | 1.011 | ASP | 0.200 | | | | |
| 14 | IR-cut filter | Plano | | 0.110 | Glass | 1.517 | 64.2 | — |
| 15 | | Plano | | 0.542 | | | | |
| 16 | Image | Plano | | — | | | | |

Reference wavelength is 587.6 nm (d-line).
The effective radius of the surface 7 is 0.730 mm.

TABLE 14

Aspheric Coefficients

| Surface # | 2 | 3 | 4 | 5 | 6 | 7 |
|---|---|---|---|---|---|---|
| k = | 1.0692E−01 | 1.0232E+00 | −6.3796E+00 | 1.7371E+01 | −9.0000E+01 | −1.3736E+01 |
| A4 = | −6.4263E−02 | −3.4946E−01 | −3.8901E−02 | −2.4569E+00 | −5.2063E−02 | 6.6018E−02 |
| A6 = | 3.7587E−02 | −3.1060E−01 | −4.3071E−01 | 1.2967E+00 | −1.1880E+00 | 2.0059E−01 |
| A8 = | −4.1138E−01 | −1.8138E−02 | −5.7115E−01 | −1.6611E+01 | 1.0061E+01 | −1.3743E+00 |
| A10 = | 1.0360E+00 | −8.9710E−02 | 2.2599E+00 | −3.4238E+01 | −3.7367E+01 | 4.0342E+00 |
| A12 = | −1.6400E+00 | 9.9679E−01 | −8.9447E−01 | 8.0844E+01 | 5.9407E+01 | −6.4256E+00 |
| A14 = | 7.3065E−01 | −7.0412E−01 | −2.5513E−01 | −3.3207E+01 | −3.3308E+01 | 5.2883E+00 |

| Surface # | 8 | 9 | 10 | 11 | 12 | 13 |
|---|---|---|---|---|---|---|
| k = | −9.0000E+01 | 2.0000E+01 | 0.0000E+00 | −3.6044E+01 | −8.8395E+00 | −5.0978E+00 |
| A4 = | −5.1016E−02 | 4.7890E−03 | 4.4823E−01 | 1.1686E−01 | −3.8559E−01 | −3.3138E−01 |
| A6 = | −2.3673E−01 | −9.9978E−01 | −2.0124E+00 | −6.3146E−01 | −2.6732E−01 | 1.8762E−01 |
| A8 = | 1.1270E+00 | 3.1304E+00 | 4.3972E+00 | 9.6924E−01 | 7.2199E−01 | −6.4174E−02 |
| A10 = | −2.2479E+00 | −5.2221E+00 | −6.9749E+00 | −8.5586E−01 | −5.0297E−01 | 3.3038E−03 |
| A12 = | −3.2244E−01 | 4.4921E+00 | 7.2507E+00 | 4.3659E−01 | 1.6871E−01 | 4.5075E−03 |
| A14 = | 5.1236E+00 | −1.5920E+00 | −4.6258E+00 | −1.1860E−01 | −2.7658E−02 | −8.5684E−04 |
| A16 = | −4.4267E+00 | | 1.3221E+00 | 1.3334E−02 | 1.7045E−03 | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from TABLE 13 and TABLE 14 as the following values and satisfy the following conditions:

| 7th Embodiment | | | |
|---|---|---|---|
| f (mm) | 2.99 | CTmin/CTmax | 10.83 |
| Fno | 2.05 | ImgH/Rlast | 2.27 |
| HFOV (deg.) | 37.0 | TL/ImgH | 1.56 |
| CRA1.0Y (deg.) | 35.0 | f/|CLT_Sagmax| | 246.48 |
| CLT (μm) | 12.0 | SD11/SDmax | 0.42 |
| CLTmax (μm) | 22.2 | SDmax/EPD | 1.18 |
| CLTmax/CLTedge | 1.00 | |(CLTR1 + CLTR2)/(CLTR1 − CLTR2)| | 3.15 |
| CLTmax/CLT | 1.85 | | |

Furthermore, in the photographing optical lens system according to the 7th embodiment, each Abbe number of the third lens element 730 and the fifth lens element 750 is 21.5, each of which is greater than 15.0 and smaller than 22.0.

8th Embodiment

Figure 18:
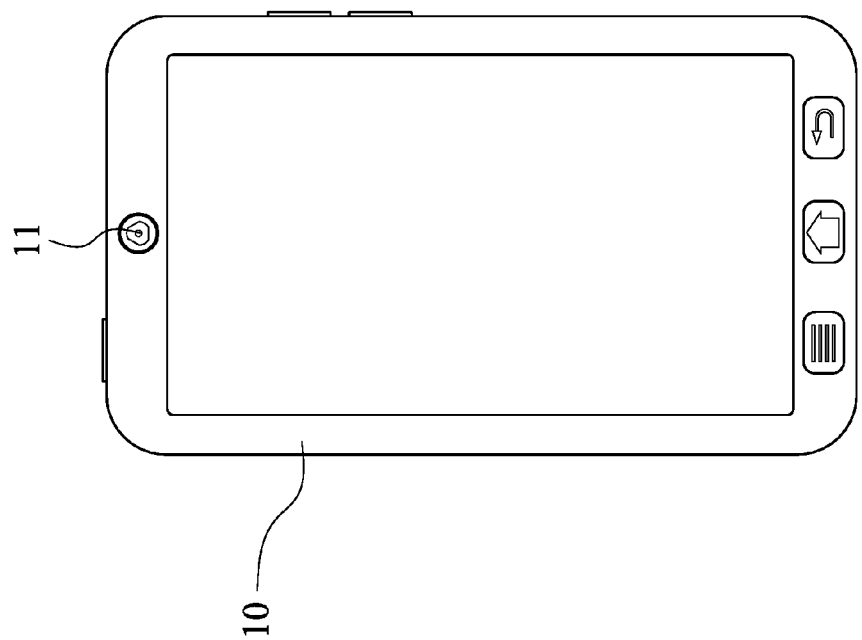
FIG. 18 shows an electronic device according to the 8th embodiment of the present disclosure.

FIG. 18 shows an electronic device 10 according to the 8th embodiment of the present disclosure. The electronic device 10 of the 8th embodiment is a smartphone, wherein the electronic device 10 includes an image capturing apparatus 11. The image capturing apparatus 11 includes a photographing optical lens system (not shown herein)

according to the present disclosure and an image sensor (not shown herein), wherein the image sensor is disposed on an image surface of the photographing optical lens system.

9th Embodiment

Figure 19:
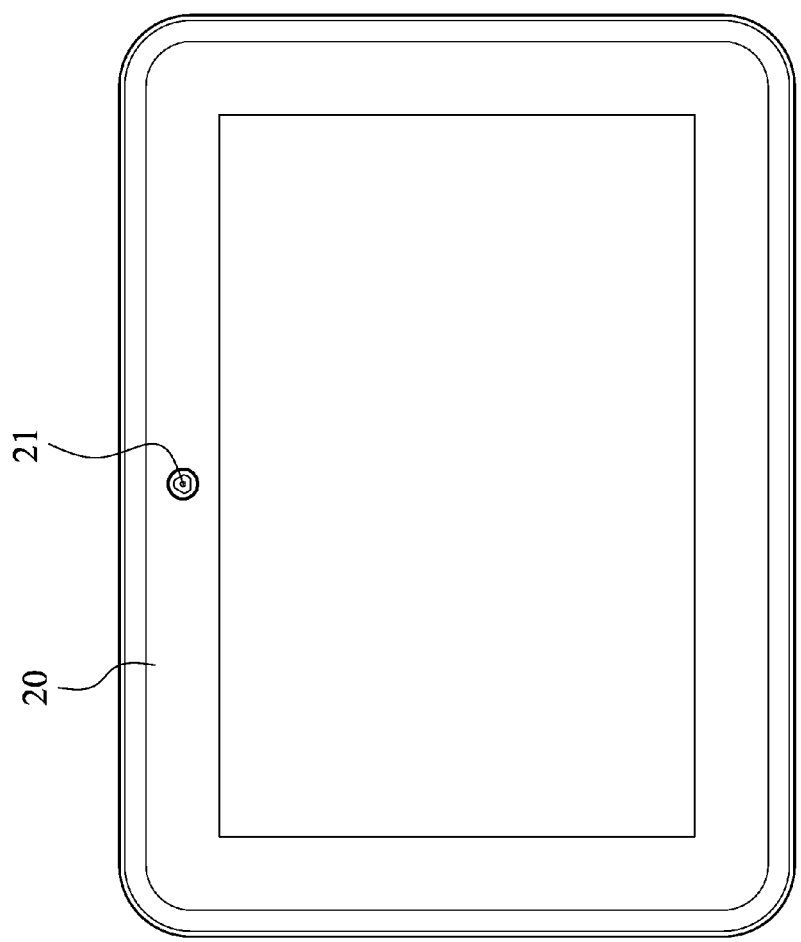
FIG. 19 shows an electronic device according to the 9th embodiment of the present disclosure.

FIG. 19 shows an electronic device 20 according to the 9th embodiment of the present disclosure. The electronic device 20 of the 9th embodiment is a tablet personal computer, wherein the electronic device 20 includes an image capturing apparatus 21. The image capturing apparatus 21 includes a photographing optical lens system (not shown herein) according to the present disclosure and an image sensor (not shown herein), wherein the image sensor is disposed on an image surface of the photographing optical lens system.

10th Embodiment

Figure 20:
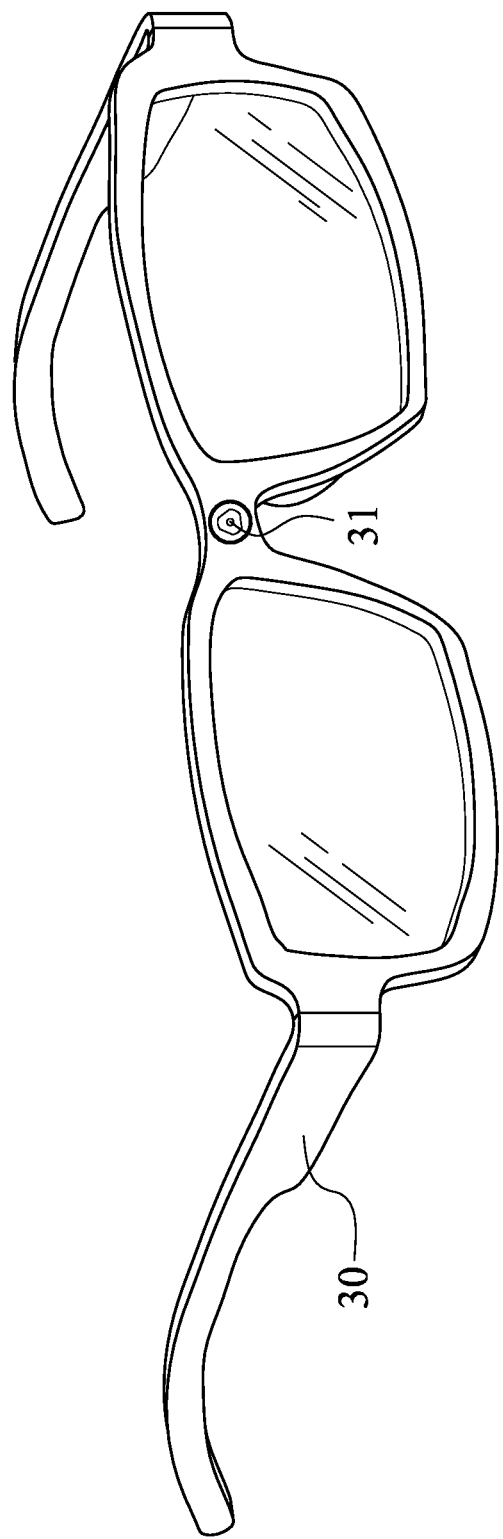
FIG. 20 shows an electronic device according to the 10th embodiment of the present disclosure.

FIG. 20 shows an electronic device 30 according to the 10th embodiment of the present disclosure. The electronic device 30 of the 10th embodiment is a wearable device, wherein the electronic device 30 includes an image capturing apparatus 31. The image capturing apparatus 31 includes a photographing optical lens system (not shown herein) according to the present disclosure and an image sensor (not shown herein), wherein the image sensor is disposed on an image surface of the photographing optical lens system.

The foregoing description, for purpose of explanation, has been described with reference to specific embodiments. It is to be noted that TABLES 1-14 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A photographing optical lens system comprising at least six lens elements, wherein the photographing optical lens system comprises:
   at least one cemented lens group cemented by two of the lens elements adjacent to each other, wherein the at least one cemented lens group comprises, in order from an object side to an image side:
      a first cemented lens element having a cemented image-side surface being aspheric;
      a cemented layer having a cemented object-side surface and a cemented image-side surface; and
      a second cemented lens element having a cemented object-side surface being aspheric;
   wherein an aspheric coefficient of the cemented image-side surface of the first cemented lens element is different from an aspheric coefficient of the cemented object-side surface of the second cemented lens element, a central thickness of the cemented layer is CLT, and the following condition is satisfied:

5 μm≤CLT≤100 μm; and wherein one of the lens elements closest to an imaged object has positive refractive power.

2. The photographing optical lens system of claim 1, wherein a maximum thickness of the cemented layer parallel to an optical axis is CLTmax, a thickness in an off-axis region of the cemented layer parallel to the optical axis is CLTedge, and the following condition is satisfied:

1.25<CLTmax/CLTedge<10.

3. The photographing optical lens system of claim 1, wherein a maximum thickness of the cemented layer parallel to an optical axis is CLTmax, the central thickness of the cemented layer is CLT, and the following condition is satisfied:

1.5<CLTmax/CLT<10.

4. The photographing optical lens system of claim 1, wherein a maximum of maximum effective radii of object-side surfaces and image-side surfaces of the lens elements of the photographing optical lens system is SDmax, an entrance pupil diameter of the photographing optical lens system is EPD, and the following condition is satisfied:

SDmax/EPD<1.75.

5. The photographing optical lens system of claim 1, wherein a curvature radius of the cemented object-side surface of the cemented layer is CLTR1, a curvature radius of the cemented image-side surface of the cemented layer is CLTR2, and the following condition is satisfied:

|(CLTR1+CLTR2)/(CLTR1−CLTR2)|<6.0.

6. The photographing optical lens system of claim 1, wherein a maximum image height of the photographing optical lens system is ImgH, a curvature radius of an image-side surface of one of the lens elements closest to an image surface is Rlast, and the following condition is satisfied:

1.0<ImgH/Rlast<4.0.

7. The photographing optical lens system of claim 1, wherein at least one of the cemented object-side surface and the cemented image-side surface of cemented layer comprises at least one critical point.

8. The photographing optical lens system of claim 1, wherein a chief ray angle at a maximum image height incident on an image surface of the photographing optical lens system is CRA1.0Y, and the following condition is satisfied:

20 degrees<CRA1.0Y<45 degrees.

9. The photographing optical lens system of claim 1, wherein the lens element closest to the imaged object is a first lens element, a maximum effective radius of an object-side surface of the first lens element is SD11, a maximum of maximum effective radii of object-side surfaces and image-side surfaces of the lens elements of the photographing optical lens system is SDmax, and the following condition is satisfied:

0.25<SD11/SDmax<0.90.

10. The photographing optical lens system of claim 1, wherein each of the lens element closest to the imaged object and one of the lens elements closest to an image surface is a single and non-cemented lens element.

11. The photographing optical lens system of claim 1, wherein a focal length of the photographing optical lens system is f, a displacement in parallel with an optical axis from an axial vertex to a maximum effective radius position on a surface having a smaller maximum effective radius of the cemented image-side surface of the first cemented lens element and the cemented object-side surface of the second cemented lens element is CLT_Sagmax, and the following condition is satisfied:

$$5 < f/|CLT\_Sagmax|.$$

12. The photographing optical lens system of claim 1, wherein the central thickness of the cemented layer is CLT, and the following condition is satisfied:

$$10\ \mu m \leq CLT \leq 70\ \mu m.$$

13. The photographing optical lens system of claim 12, wherein the first cemented lens element has positive refractive power, and the second cemented lens element with negative refractive power has a convex image-side surface.

14. The photographing optical lens system of claim 1, wherein a maximum thickness of the cemented layer parallel to an optical axis is CLTmax, and the following condition is satisfied:

$$20\ \mu m \leq CLTmax \leq 150\ \mu m.$$

15. The photographing optical lens system of claim 1, wherein each of the first cemented lens element and the second cemented lens element is made of a plastic material, an axial distance between an object-side surface of the lens element closest to the imaged object and an image surface is TL, a maximum image height of the photographing optical lens system is ImgH, and the following condition is satisfied:

$$TL/ImgH < 3.0.$$

16. The photographing optical lens system of claim 1, wherein a minimum of central thicknesses of lens elements of the photographing optical lens system is CTmin, a maximum thickness of the cemented layer parallel to an optical axis is CLTmax, and the following condition is satisfied:

$$2.0 < CTmin/CLTmax < 25.$$

17. The photographing optical lens system of claim 1, wherein the cemented lens group has negative refractive power.

18. The photographing optical lens system of claim 1, wherein at least one of the lens elements of the photographing optical lens system has an Abbe number greater than 15.0 and smaller than 22.0.

19. An image capturing apparatus, comprising:
   the photographing optical lens system of claim 1; and
   an image sensor, wherein the image sensor is disposed on an image surface of the photographing optical lens system.

20. An electronic device, comprising:
   the image capturing apparatus of claim 19.

* * * * *